(12) United States Patent
Di Monte, Sr.

(10) Patent No.: US 9,657,468 B1
(45) Date of Patent: May 23, 2017

(54) DUAL AIR ADMITTANCE VALVE

(71) Applicant: AA Anti-Air-Lock Corp, Iselin, NJ (US)

(72) Inventor: Michael Anthony Di Monte, Sr., Cream Ridge, NJ (US)

(73) Assignee: AA ANTI-AIR-LOCK CORP.

( * ) Notice: Subject to any disclaimer, the term of this patent is extended or adjusted under 35 U.S.C. 154(b) by 0 days.

(21) Appl. No.: 15/293,315

(22) Filed: Oct. 14, 2016

Related U.S. Application Data

(63) Continuation-in-part of application No. 15/275,419, filed on Sep. 25, 2016, which is a continuation-in-part of application No. 15/246,464, filed on Aug. 24, 2016, which is a continuation-in-part of application No. 15/132,131, filed on Apr. 18, 2016.

(51) Int. Cl.
| | |
|---|---|
| *E03C 1/122* | (2006.01) |
| *F16K 15/04* | (2006.01) |
| *F16K 27/02* | (2006.01) |
| *F16K 15/14* | (2006.01) |
| *B01D 46/00* | (2006.01) |
| *B01D 46/42* | (2006.01) |

(52) U.S. Cl.
CPC ........ *E03C 1/1225* (2013.01); *B01D 46/0089* (2013.01); *B01D 46/4272* (2013.01); *F16K 15/042* (2013.01); *F16K 15/048* (2013.01); *F16K 15/144* (2013.01); *F16K 27/0209* (2013.01)

(58) Field of Classification Search
CPC .... E03C 1/1225; F16K 15/042; F16K 15/046; F16K 27/0209; F16K 15/144; F16K 15/08; F16K 15/048; B01D 46/0089; B01D 46/4272

USPC ........ 137/512, 533.11, 512.15, 512.3, 512.4, 137/613
See application file for complete search history.

(56) References Cited

U.S. PATENT DOCUMENTS

| | | | | |
|---|---|---|---|---|
| 1,724,878 A | * | 8/1929 | Jensen | F16K 17/36 137/43 |
| 1,801,407 A | * | 4/1931 | Barks | F16K 15/02 137/408 |
| 1,977,806 A | * | 10/1934 | Richardson | F16K 27/00 137/512 |
| 2,656,855 A | * | 10/1953 | Booth | B60T 11/32 137/484.6 |
| 4,139,469 A | * | 2/1979 | Rainin | B01D 15/166 137/512 |
| 4,387,736 A | * | 6/1983 | Major | F04B 11/0033 137/512 |
| 4,945,945 A | * | 8/1990 | Schmid | F16K 15/04 137/512 |
| 7,331,360 B2 | * | 2/2008 | Camis, Jr. | F16K 15/144 137/512.3 |
| 7,484,526 B2 | * | 2/2009 | Zelson | F16K 15/144 137/515.7 |
| 9,285,044 B2 | * | 3/2016 | Chambers | F16K 15/18 |
| 2016/0032920 A1 | * | 2/2016 | Hatami Aghdam | F04B 15/06 417/443 |

* cited by examiner

*Primary Examiner* — Kevin Lee

(57) ABSTRACT

An apparatus to allow or stop an air flow into an enclosed environment or piping system comprises (a) a housing having an upper flow passage, a middle flow passage, a lower flow passage; (b) a first valve seat; (c) a first valve diaphragm; (d) a second valve seat; and (e) a second valve diaphragm.

25 Claims, 30 Drawing Sheets

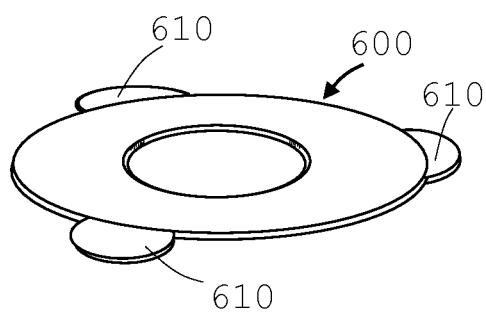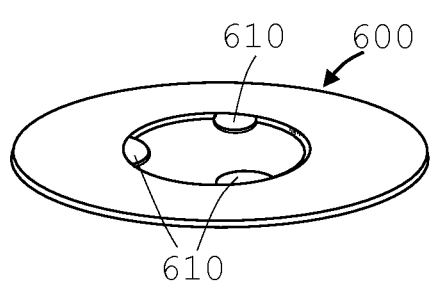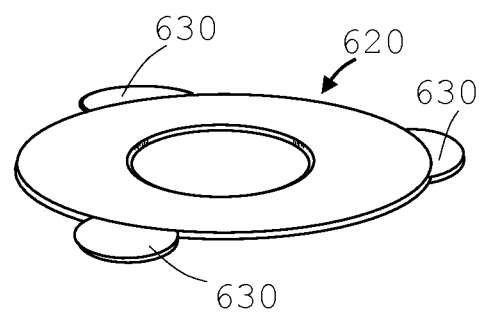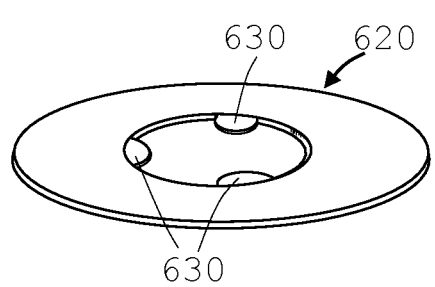
FIG. 24　　　　　　FIG. 25

DUAL AIR ADMITTANCE VALVE

CROSS-REFERENCE RELATED TO RELATED APPLICATIONS

This application is a continuation-in-part of commonly-owned, same inventor, presently co-pending U.S. Nonprovisional patent application Ser. No. 15/275,419, filed Sep. 25, 2016, which is incorporated herein by reference in its entirety. The presently co-pending application Ser. No. 15/275,419 is a continuation-in-part of commonly-owned, same inventor, presently co-pending U.S. Nonprovisional patent application Ser. No. 15/246,464, filed Aug. 24, 2016, which is incorporated herein by reference in its entirety. The co-pending Nonprovisional patent application Ser. No. 15/246,464 application is also a continuation-in-part of commonly-owned, same inventor, presently co-pending U.S. Nonprovisional patent application Ser. No. 15/132,131, filed Apr. 18, 2016, which is incorporated herein by reference in its entirety. U.S. Nonprovisional patent application Ser. No. 15/132,131 also claims the priority and benefit of US provisional patent application No. U.S. Provisional Application No. 62/151,463, filed Apr. 23, 2015.

BACKGROUND

A variety of air admittance valves have been made over the years for allowing air to enter a piping system or an enclosed environment under a negative or vacuum pressure, which is created when water is flowing down the drain for instance thus to preventing siphoning of traps or when a sump pump keeps pumping water and air out of an enclosed sump pit. Attaching an air admittance valve allows ambient air to enter the enclosed environment to eliminate negative pressure or vacuum in the enclosed system. Many of these products are specifically or only designed for systems such as piping systems and sewer systems where a local vent or air intake is not possible or due to the difficulty of running pipes through an already built home. Typically, these air admittance valves only provide specific operating conditions such as the vacuum pressure in the amount of air required. The air admittance valves available in the market today do not provide for an instantaneous and higher volume of air demand. And this causes a problem when existing air admittance components are installed on systems requiring the higher air flow demand. This problem causes strain on the air admittance component and cause it to fail prematurely in addition it causes it to operate against its own design because it was designed to work on a natural gravity air flow vacuum or negative pressure constraint. Also it is a problem that the air admittance valves not working at all or failing immediately when a high air flow demand is required. Furthermore, another problem is that air admittance components available do not filter the air and therefore can allow for corrosive environment to enter the system and damaging the Air admittance components.

There is also an undesired negative situation that the piping system will generate a negative pressure in the piping system when the flow is drained from the piping system. When negative pressure occurs, the water seals in the U-band or trap will be syphoned out and losses the function to prevent sewer gas to enter the house. Therefore, various air admittance valves have designed to allow air enter a piping system to prevent the negative pressure environment. However, regular air admittance valve is also easy to fail.

For these reasons are users are disappointed when there is no product available on the market that they can use for a higher volume demand in a negative pressure scenario such as an enclosed pit with a pump requiring air to enter the system at the same rate of which it is pumping the water out. For instance, a pump that can pump 20 gallons per minute and would require a large demand of air flow to enter the system so that a vacuum does not occur putting stress on the pump and causing the water discharge to not operate and discharge the water properly. In the case of a sump pump, the pump becomes air locked and runs continuous which causes the pump to overheat, burnout and/or fail causing the area to flood and cause water damage to the building.

In many cases it is also required that after air enters the system that there is a proper seal in place to provide a radon gas, water and airtight seal after the air has been allowed to enter the system and when the pump disengages. It is also required that if failure is to occur on such an air admittance component that it must fail in a closed/sealed position providing continued protection so that no air, water or radon gas can escape into the air within the building or within a certain high of the structures roof line on the exterior.

Although some check valves have the design of a ball inside the valve to stop or open the flow to pass through the valve. However, those ball valve tends to have accumulated scum or fouls on the ball that cause the ball not able to seal the flow properly. Also, such ball valve, after having scum or fouls on the ball, will not have a proper rotation to reduce the opportunity of wearing of the ball in same location.

Another issue currently in the market is that the detection of the leakage of the valve is not easy. Since the valve has one end connected to the ambient air and one end to the plumbing system or the enclosed environment, the pressure status detected is either the ambient environment's pressure or the plumbing system's pressure. Those two pressure cannot be used to detect whether the valve is leaked or not. Often the valve is worn out and the valve seat cannot seal the foul air very well. The leakage might be subtle. Therefore, it is hard to detect from the ambient air pressure or the pressure in the plumbing system, which varied in accordance to the flow movement in the plumbing system.

Another issue also crucial to the current air admittance valve in the market is that there is no double assurance in single valve to ensure that failure of the valve can be made up by other mechanism. Often, the current practice is to install two check valves inline, which is problematic that this practice causes too much connecting spaces and extra works, and also the losses of energy due to the energy losses in multiple connection entrances. Therefore, there is a long-felt need to resolve aforementioned issues.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims. The subject matters of this application overcomes the aforementioned problems and may be used as an apparatus to allow or stop an air flow into an enclosed environment or piping system comprises (a) a housing having an upper flow passage, a middle flow passage, a lower flow passage; (b) a first valve seat; (c) a first valve diaphragm; (d) a second valve seat; and (e) a second valve diaphragm.

The apparatus is an invention that allows for the required volume of air to enter a piping system or an enclosed environment when there is a sufficient pressure difference between the ambient environment and the negative pressure in the piping system or an enclosed environment generating sufficient force to lift the rotary valve, the rotary valve will open and allow air/water flow to enter the piping system or enclosed environment. Therefore, the negative pressure will be eliminated.

When the piping system has radon gas, methane or other gas that generate positive pressure in the piping system or the enclosed environment the rotary valve will stay in the closed position and prevents radon gas, methane or other gas from leaving the piping system or the enclosed environment. The invention provides the proper seal by the rotary valve which has many advantage than the traditional flap valve. The rotation of the rotary valve will allow the contact points of the valve and the valve seat to constantly rotate and change, which will prolong the life of the valve. The rotation of the rotary valve will have less friction to move since rotational friction is less than static rotation. The rotation of the rotary valve will be less likely to be clogged and have less noise. The guide rails will allow the rotary valve to properly return back to the valve seat even when the air admittance and check valve is not installed vertically, which is a burdensome requirement for all other types of air admittance and check valves.

The current invention also resolves another two issues mentioned in the background: the leakage of the valve and the detection of the leakage. The dual design of the valve ensures the air admittance valve still able to seal the flow when one of the valve seat or the valve is failed. Also, the current invention also is able to create a positive, neutral, or negative pressure within the valve. The pressure status can be known and indicated by the invention. When the pressure status changes and is detected by the invention, the leakage of the valve will be detected.

BRIEF DESCRIPTION OF THE DRAWINGS

It should be understood that the drawings are merely representative, are not necessarily drawn to scale, and are not intended to limit the subject matter of this application.

FIG. 24 is a perspective view of one of the embodiments of the invention having protruding members outside.

FIG. 25 is a perspective view of one of the embodiments of the invention having protruding members inside.

DETAILED DESCRIPTION

Figure 1:
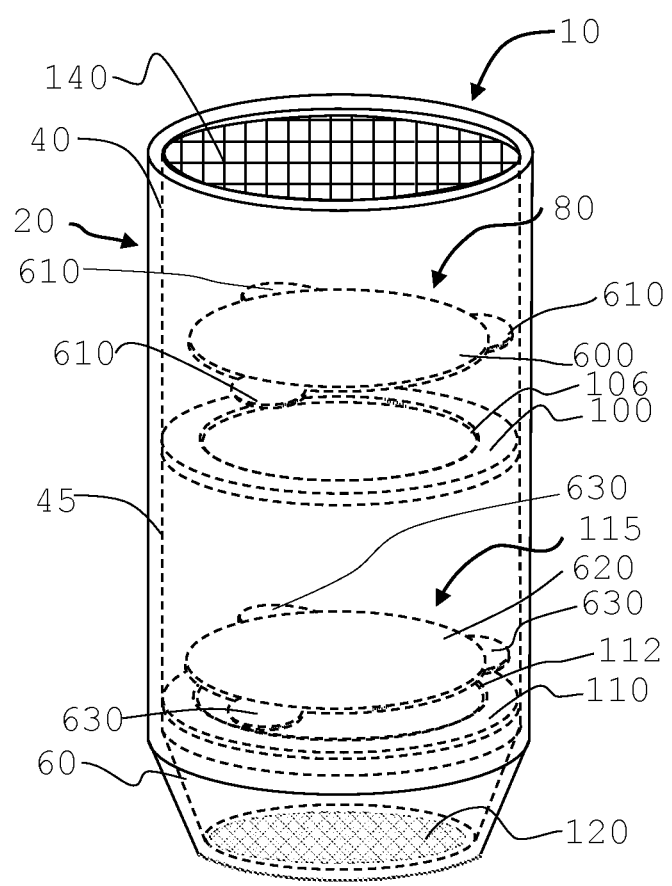
FIG. 1 is a perspective view of one of the embodiments of the invention.

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Other than in the embodiment or example, or where indicated otherwise, all numbers indicating ingredient quantities and/or reaction conditions are to be understood as being modified in every instance by the word "about," which means the ingredient quantities or reaction conditions are within 10 percent to 15 percent of the indicated value.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and the may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Figure 2:
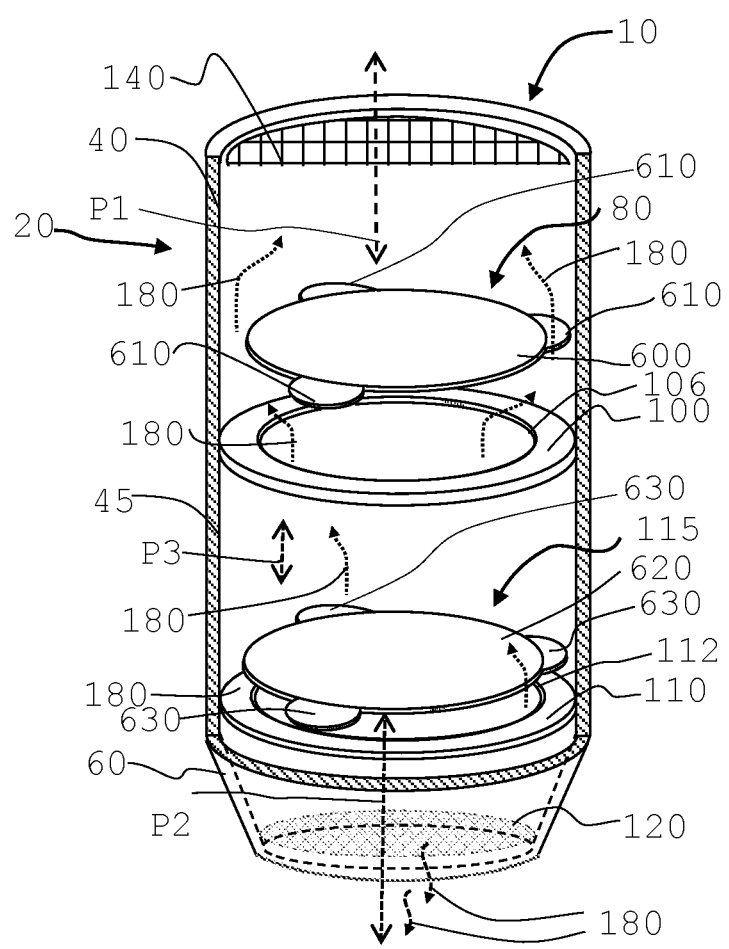
FIG. 2 is a partially sectional view of one of the embodiments of the invention.
Figure 5:
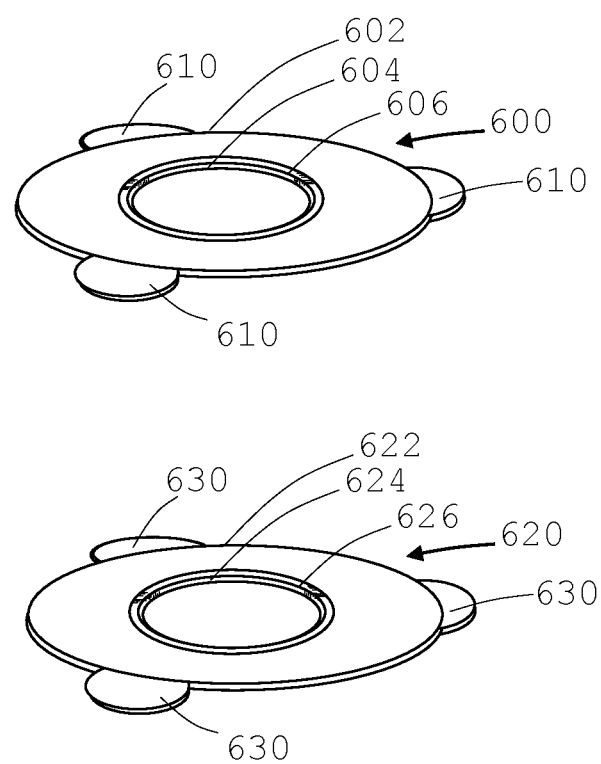
FIG. 5 is a perspective view of one of the embodiments of first valve diaphragm and second valve diaphragm.

Referring to FIG. 1, FIG. 2, and FIG. 5 in one embodiment of the invention, the apparatus 10 to allow or stop an air flow 180, comprises (a) a housing 20 having an upper flow passage 40, a middle flow passage 45, a lower flow passage 60, wherein the upper flow passage 40 is above the middle flow passage 45, wherein the middle flow passage 45 is above the lower flow passage 60, wherein a upper flow passage pressure P1 exists in the upper flow passage 40, wherein a middle flow passage pressure P3 exists in the middle flow passage 45, and wherein a lower flow passage pressure P2 exists in the lower flow passage 60; (b) a first valve seat 100, wherein the first valve seat 100 is between the upper flow passage 40 and the middle flow passage 45, and wherein a first opening 106 is formed on the first valve seat 100; (c) a first valve diaphragm 600, wherein the first valve diaphragm 600 is dimensioned and configured to be inside the upper flow passage 40, wherein the first valve diaphragm 600 is configured and dimensioned to substantially cover the first opening 106 of the first valve seat 100, wherein the first valve diaphragm 600 has an outer circumference 602, wherein the first valve diaphragm 600 further comprises a plurality of protruding members 610 extending radially from the outer circumference 602, wherein the first valve diaphragm 600 has a predetermined weight, and wherein the first valve diaphragm 600 can move upwardly and downwardly above the first valve seat 100; (d) a second valve seat 110, wherein the second valve seat 110 is between the middle flow passage 45 and the lower flow passage 60, and wherein a second opening 112 is formed on the second valve seat 110; and (e) a second valve diaphragm 620, wherein the second valve diaphragm 620 is dimensioned and configured to be inside the middle flow passage 45, wherein the second valve diaphragm 620 is configured and dimensioned to substantially cover the second opening 112 of the second valve seat 110, wherein the second valve diaphragm 620 has an outer circumference 622, wherein the second valve diaphragm 620 further comprises a plurality of protruding members 630 extending radially from the outer circumference 622, and wherein the second valve diaphragm 620 have a predetermined weight, wherein the second valve diaphragm 620 can move upwardly and downwardly above the second valve seat 110, wherein the first valve diaphragm 600 is in an open position 102 when the first valve diaphragm 600 is moved away from the first valve seat 100, wherein the first valve diaphragm 600 is in a closed position 104 when the first valve diaphragm 600 is disposed on the first valve seat 100, and wherein the second valve diaphragm 620 is in an open position 102 when the second valve diaphragm 620 is moved away from the second valve seat 110, and wherein the second valve diaphragm 620 is in a closed position 104 when the second valve diaphragm 620 is disposed on the second valve seat 110.

Also referring to FIG. 1, FIG. 2, in one preferred embodiment, the first valve diaphragm 600 and second valve diaphragm 620 are made of material having a Shore Hardness between about 20 A and about 50 A, such as but not limited to rubber, PTFE (Fluoropolymer), EPDM (Ethylene Propylene Diene Monomer), silicon, and combination thereof. In another preferred embodiment, the first valve seat 100 and the second valve seat 110 are made of hard materials over about Shore Hardness 90 A, such as but not limited to PVC (Polyvinyl chloride), metal, or HDPE (High Density Polyethylene).

Referring to FIG. 3, FIG. 4, FIG. 4A, FIG. 4B, FIG. 4C, FIG. 4D, in one embodiment of the invention, the apparatus 10 further comprises (a) a first rotary valve 80 inside the housing 20, wherein the first rotary valve 80 further comprises a main body 82, wherein the first rotary valve 80 has a predetermined weight, wherein the first rotary valve 80 is within the upper flow passage 40 and is above the first valve diaphragm 600, and wherein the first rotary valve 80 can move upwardly and downwardly inside the upper flow passage 40 and above the first valve diaphragm 600; and (b) a second rotary valve 115 inside the housing 20, wherein the second rotary valve 115 further comprises a main body 117, wherein the second rotary valve 115 has a predetermined weight, wherein the second rotary valve 115 is within the middle flow passage 45 and is above the second valve diaphragm 620, and wherein the second rotary valve 115 can move inside upwardly and downwardly in the middle flow passage 45 and above the second valve diaphragm 620.

Also referring to FIG. 3, FIG. 4, FIG. 4A, FIG. 4B, FIG. 4C, FIG. 4D, in one embodiment of the invention, the apparatus 10, wherein a first center opening 604 is formed through the first valve diaphragm 600, wherein the first center opening 604 is configured and dimensioned to engage the main body 82 of the first rotary valve 80 and to prevent the first rotary valve 80 from passing through the first center opening 604, wherein a second center opening 624 is formed through the second valve diaphragm 620, and wherein the second center opening 624 is configured and dimensioned to engage the main body 117 of the second rotary valve 115 and to prevent the second rotary valve 115 from passing through the second center opening 624. The first rotary valve 80 can move upwardly and downwardly inside the upper flow passage 40. When the middle flow passage pressure P3 is greater than the predetermined weight of the first rotary valve 80 and the upper flow passage pressure P1, the first rotary valve 80 will be lifted upwardly away from the first center opening 604 and the first rotary valve 80 is in an open position 102 allowing air flow 180 to pass through the first center opening 604 into the upper flow passage 40. If the middle passage pressure P3 is still greater than the predetermined weight of the first valve diaphragm 600 and the upper flow passage pressure P1, the first valve diaphragm 600 will be lifted away from the first valve seat 100 allowing air flow 180 to pass through the first opening 106 on the first valve seat 100. The second rotary valve 115 can move upwardly and downwardly inside the middle flow passage 45. When the lower flow passage pressure P2 is greater than the predetermined weight of the second rotary valve and the middle flow passage pressure P3, the second rotary valve 115 will be lifted upwardly away from the second center opening 624 and the second rotary valve 115 is in an open position 102 allowing air flow 180 to pass through the second center opening 624 into the upper flow passage 40. If the lower passage pressure P2 is still greater than the predetermined weight of the second valve diaphragm 620 and the middle flow passage pressure P3, the second valve diaphragm 620 will be lifted away from the second valve seat 110 allowing air flow 180 to pass through the second opening 112 on the second valve seat 110. When the combination of the predetermined weight of the first rotary valve 80, the predetermined weight of the first valve diaphragm 600, and the upper passage pressure P1 is greater than the middle flow passage pressure P3, the first rotary valve 80 will reside on the first valve diaphragm 600, which will further reside on the first valve seat 100, and the air flow 180 from middle flow passage 45 will be stopped and blocked from passing into upper flow passage 40. When the combination of the predetermined weight of the second rotary valve 115, the predetermined weight of the second valve diaphragm 620, and the middle passage pressure P3 is greater than the lower flow passage pressure P2, the second rotary valve 115 will reside on the second valve diaphragm 620, which will further reside on the second valve seat 110, and the air flow 180 from lower flow passage 60 will be stopped and blocked from passing into middle flow passage 45. The material of first valve diaphragm 600 and second valve diaphragm 620 can be made of material having a Shore Hardness between about 20 A and about 50 A, such as but not limited to rubber, PTFE (Fluoropolymer), EPDM (Ethylene Propylene Diene Monomer), silicon, and combination thereof. In another preferred embodiment, first valve diaphragm 600 and second valve diaphragm 620 are made of hard materials over about Shore Hardness 90 A, such as but not limited to PVC (Polyvinyl chloride), metal, or HDPE (High Density Polyethylene). The first rotary valve 80 and second rotary valve 115 can be hollow and be filled with Argon gas so that the size of rotary valve will be inert to the ambient temperature changes. The less change of the rotary valve will be better off to seal of the gas consistently.

Referring to FIG. 5, wherein the first valve diaphragm 600 is made of hard material, and wherein an inner circumference 606 (not shown) of the first center opening 604 is flushed with soft material, wherein the second valve diaphragm 620 is made of hard material, and wherein an inner circumference 626 of the second center opening 624 is flushed with soft material. The inner circumference 606 and inner circumference 626 is flushed with soft material having a Shore Hardness between 20 A and about 50 A, such as but not limited to rubber, PTFE (Fluoropolymer), EPDM (Ethylene Propylene Diene Monomer), silicon, and combination thereof.

Referring to FIG. 6, FIG. 7, FIG. 7A, FIG. 7B, FIG. 7C, FIG. 7D, in one preferred embodiment of the invention, wherein a first center opening 604 is formed through the first valve diaphragm 600, wherein the first center opening 604 is configured and dimensioned to engage the main body 82 of the first rotary valve 80 and to prevent the first rotary valve 80 from passing through the first center opening 604, wherein a second center opening 624 is formed through the second valve diaphragm 620, and wherein the second center opening 624 is configured and dimensioned to engage the main body 117 of the second rotary valve 115 and to prevent the second rotary valve 115 from passing through the second center opening 624, wherein the first valve diaphragm 600 further comprises a first membrane 608 covering the first center opening 604, wherein the first membrane 608 is flexible to be stretched upwardly and downwardly, and wherein the weight of the first rotary valve 80 pushes down the first membrane 608 when the first rotary valve 80 is disposed on the first membrane 608, wherein the second valve diaphragm 620 further comprises a second membrane 628 covering the second center opening 624, wherein the second membrane 628 is flexible to be stretched upwardly and downwardly, and wherein the weight of the second rotary valve 115 pushes down the second membrane 628 when the second rotary valve 115 is disposed on the second membrane 628. Through the deformation of the first membrane 608 and the second membrane 628, the apparatus 10 can adjust the middle flow passage pressure P3. When the first membrane 608 is stretched down and deformed more than the deformation of the second membrane 628, the middle flow passage pressure P3 is increased due to the compression of the space between the first valve diaphragm 600 and the second valve diaphragm 620. When the second membrane 628 is stretched and deformed more relatively to the first membrane 608, the middle flow passage pressure P3 is decreased due to the expansion of the space between the first valve diaphragm 600 and the second valve diaphragm 620. The deformation difference can be made through the different weights of the first rotary valve 80 and the second rotary valve 115. When the first rotary valve 80 is relative heavier than the second rotary valve 115, the first membrane 608 will be deformed more relatively to the second membrane 628. The deformation difference can be also achieved by using material with different flexibility. When the flexibility of the first membrane 608 is relatively more than the flexibility of the second membrane 628, the first membrane 608 will deform more even when the first rotary valve 80 has the same weight as the second rotary valve 115 has. The flexibility of the material can be represented by the Shore Hardness. The lower number of Shore Hardness, such as Shore Hardness 20 A, represents the softer material and larger flexibility. The same adjustment to the middle flow passage pressure can also be achieved by the deformation of the first valve diaphragm 600 and the second valve diaphragm 620 when the first valve diaphragm 600 and second valve diaphragm are made of flexible, resilient material of a Shore Hardness between about 20 A and about 50 A, such as but not limited to rubber, PTFE (Fluoropolymer), EPDM (Ethylene Propylene Diene Monomer), silicon, and combination thereof. The relatively increased pressure of the middle flow passage pressure P3 resolves the issue to detect the leakage of the valves. When the relatively increased pressure of the middle flow passage pressure P3 is detected (see FIG. 13), it means there is no leakage of the seal by the first rotary valve 80, the first valve diaphragm 600 and first valve seat 100 as well as the seal by the second rotary valve 115, second valve diaphragm 620 and the second valve seat 110.

Figure 3:
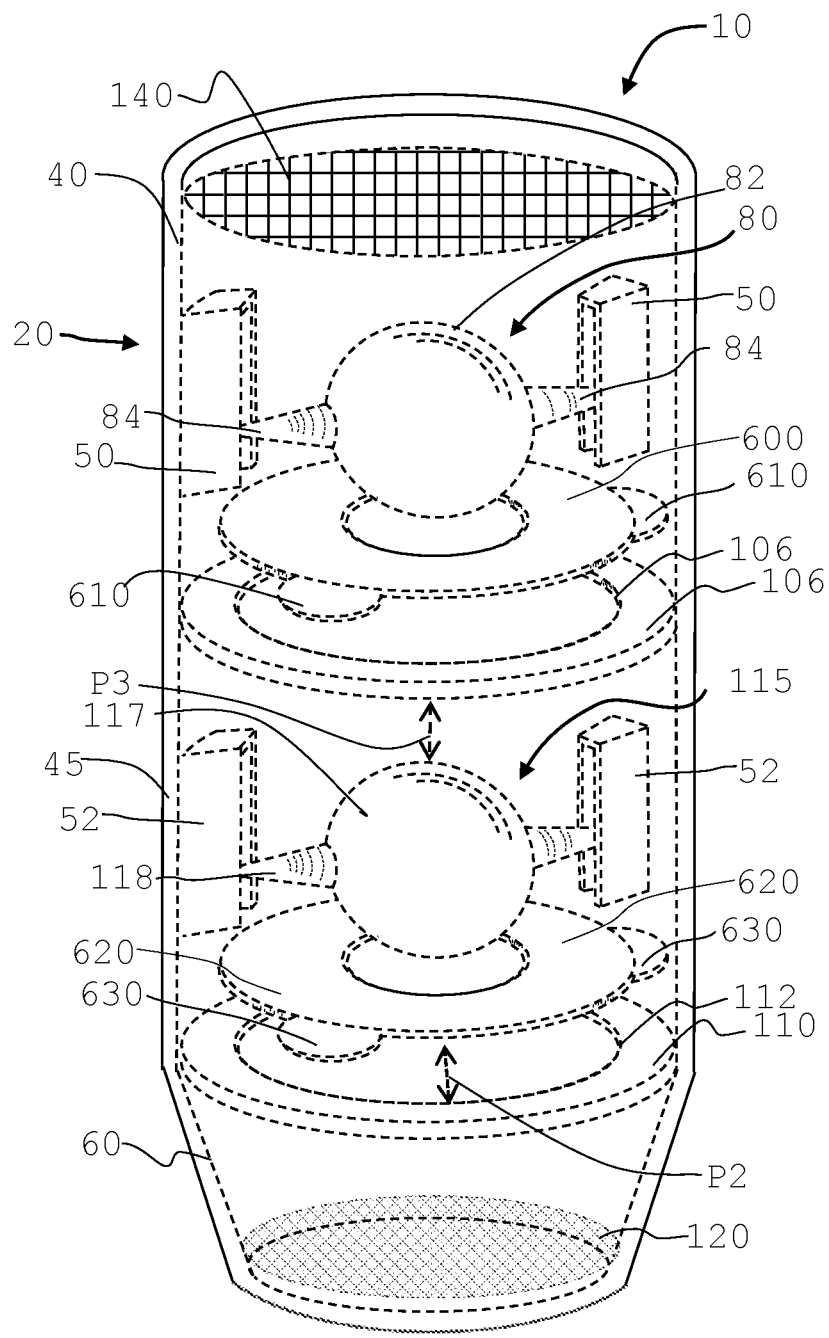
FIG. 3 is a perspective view of one of the embodiments of the invention having a rotary valve.
Figure 6:
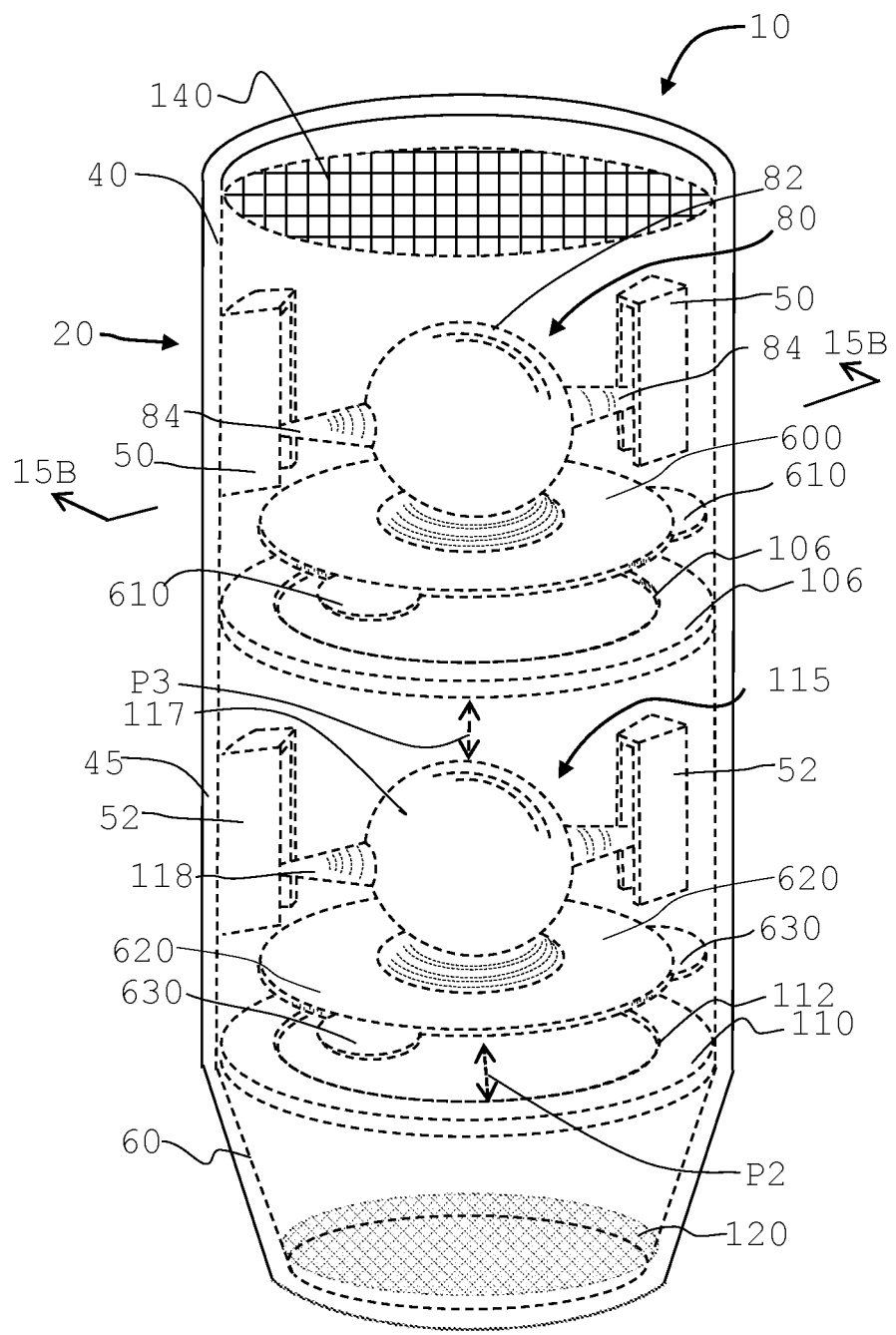
FIG. 6 is a perspective view of one of the embodiments of the invention having a membrane.

Also referring to FIG. FIG. 3 and FIG. 6, in one embodiment of the invention, the apparatus 10 further comprises (a) two first guides 84 mounted to the main body 82 of the first rotary valve 80, wherein the two first guides 84 are opposite to each other; (b) two first guide rails 50 disposed inside upper flow passage 40 for guiding the first rotary valve 80 between an open position 102 and a closed position 104, wherein the each of two first guides 84 of the first rotary valve 80 are disposed in each of the two first guide rails 50, wherein the two first guides 84 move freely in the two first guide rails 50, wherein the two first guide rails 50 are attached to the housing 20; (c) two second guides 118 mounted to the main body 117 of the second rotary valve 115, wherein the two second guides 118 are opposite to each other; and (d) two second guide rails 52 disposed inside middle flow passage 45 for guiding the second rotary valve 115 between an open position 102 and a closed position, wherein the each of two second guides 118 of the second rotary valve 115 are disposed in each of the two second guide rails 52, wherein the two second guides 118 move freely in the two second guide rails 52, and wherein the two second guide rails 52 are attached to the housing 20.

Also referring to FIG. 1, FIG. 2, FIG. 3, FIG. 4, FIG. 6, and FIG. 7, in one embodiment, the lower flow passage filter 120 in the lower flow passage 60 and the upper flow passage filter 140 in the upper flow passage 40 prevents particles and pollutants in the air flow 180 from entering the housing 20 and prevents foreign objects, such as particles and bugs, from passing through the apparatus 10. The sieve size of the lower flow passage filter 120 and upper flow passage filter 140 can be varied with the need to filter the target particle sizes, such as the size of bugs, dust particle, or fume particle. The apparatus 10 can be connected with other pipes or conduits by any types of pipe connection, such as but not limited to fastener, treaded pipe, solvent welding, soldering, brazing, welding compression fittings, or crimped. The material of the housing 20 can be such as but not limited to plastic, copper, brass, cast iron, steel, and other commonly used in the field of art of piping.

Figure 8:
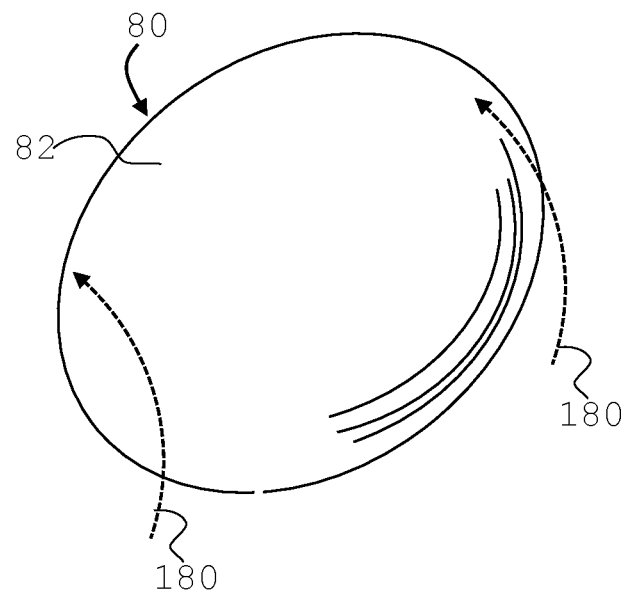
FIG. 8 is a perspective view of one of the embodiments of the rotary valve without guides and turbulators.

Referring to FIG. 8, in one embodiment of the apparatus 10, the first rotary valve 80 has a main body 82 in an oval shape with two first guides 84 mounted to the main body 82 opposite to each other (first guides 84). The first rotary valve 80 can be rotated by air flow 180. Same configurations are applied to second rotary valve 115.

Figure 9:
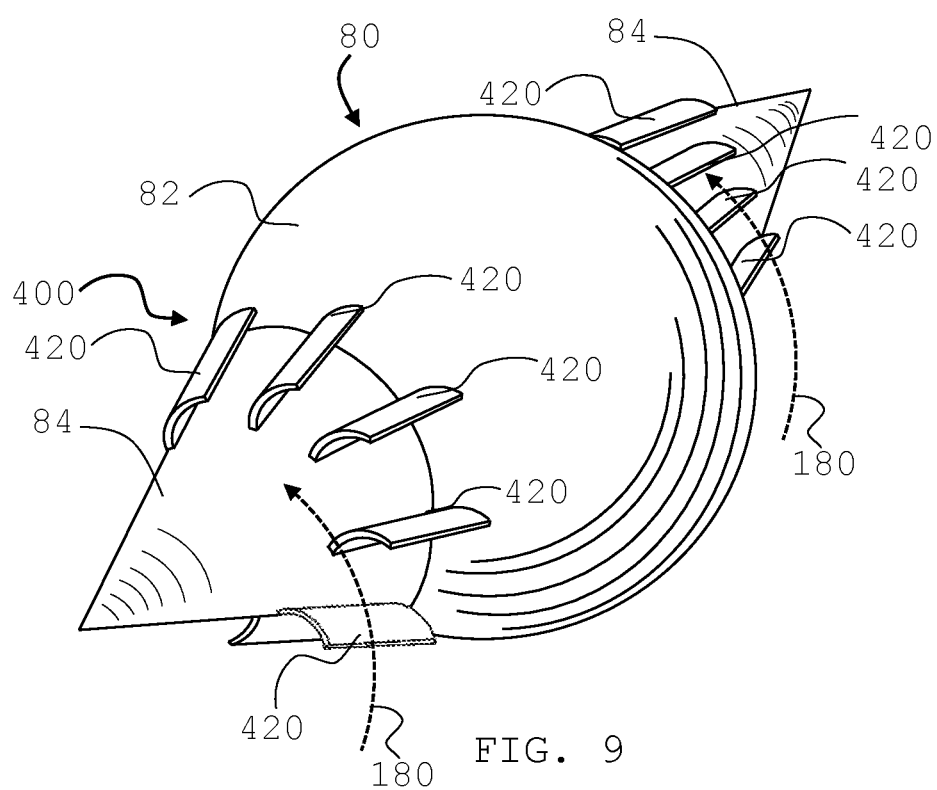
FIG. 9 is a perspective view of one of the embodiments of the rotary valve without guides and turbulators on the guides.

Referring to FIG. 9, in one embodiment of the apparatus 10 further comprises two turbulators 400 mounted on each of the two guides 84, wherein the two turbulators 400 comprises a plurality of impellers 420 radially mounted to each of the first guides 84, and wherein the two turbulators 400 rotate the first rotary valve 80 when the air flow 180 from the lower flow passage 60 pushes the plurality of impellers 420. The plurality of impellers 420 slated in one single direction will ensure the first rotary valve 80 and the second rotary valve 115 rotate in one direction and faster than the first rotary valve 80 and the second rotary valve 115 without the two turbulators 400. The uniform rotation direction of the first rotary valve 80 and second rotary valve 115 will increase the speed of the first rotary valve 80 and the second rotary valve 115 going up to open the first rotary valve 80 and the second rotary valve 115. The increased rotation speed of the first rotary valve 80 and the second rotary valve 115 will allows the self-cleaning of the valve to remove foul or scum accumulated on the first rotary valve 80 on the first opening 106 and the second rotary valve 115 on the second opening 112. Same configuration of turbulators 400 are configured to the two second guides 118 of the second rotary valve 115.

Figure 10:
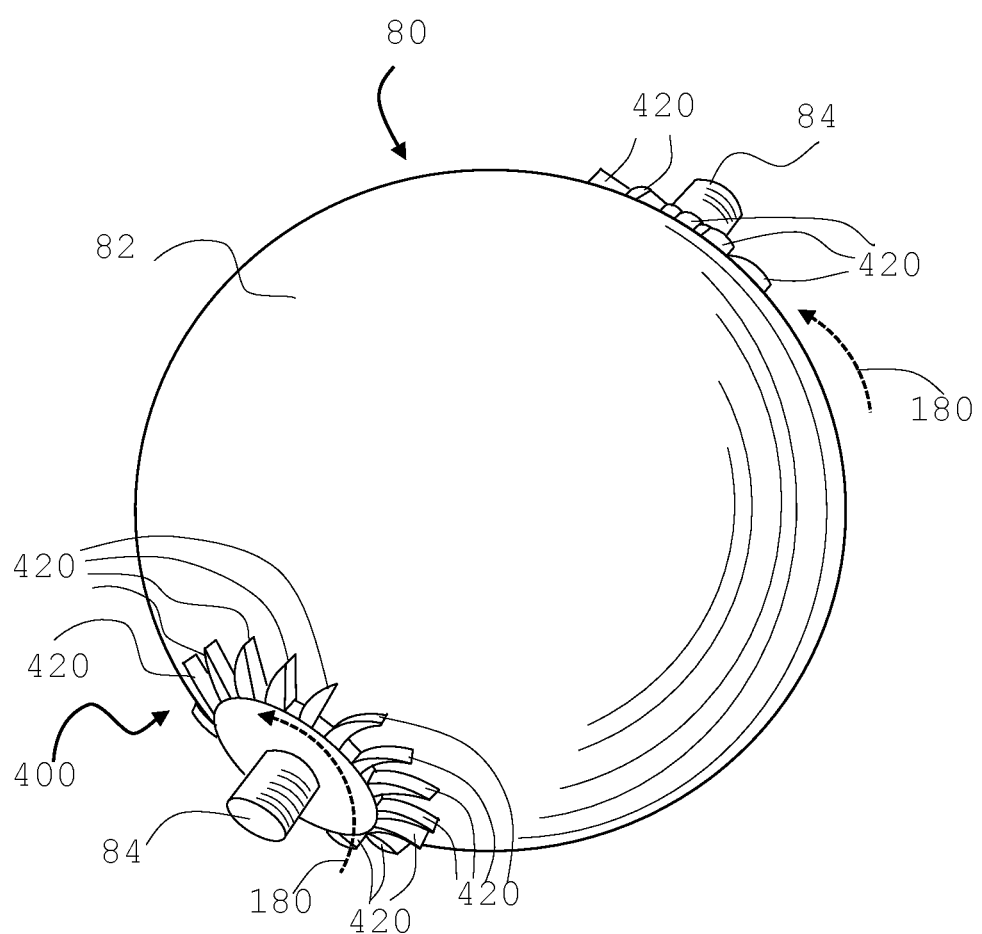
FIG. 10 is a perspective view of one of the embodiments of the rotary valve without guides and turbulators on the main body.

Referring to FIG. 10, in one embodiment of the apparatus 10 further comprises two turbulators 400, wherein each of the two turbulators 400 comprises a plurality of impellers 420 mounted to the main body 82 of the first valve 80, wherein the plurality of impellers 420 are arranged in a circle around each of the two guides 84, wherein each of the two turbulators 400 are opposite to each other, and wherein the two turbulators 400 rotate the first rotary valve 80 when the air flow 180 from the lower flow passage 60 pushes the plurality of impellers 420. The plurality of impellers 420 in one single direction will ensure the first rotary valve 80 and the second rotary valve 115 rotate in one direction and faster than the first rotary valve 80 and the second rotary valve 115 without turbulators 400. The uniform rotation direction of the first rotary valve 80 and the second rotary valve 115 will increase the speed of the first rotary valve 80 and the second rotary valve 115 going up to open the first rotary valve 80 and the second rotary valve 115. Same configuration of turbulators 400 are configured to the two second guides 118 of the second rotary valve 115.

Figure 11:
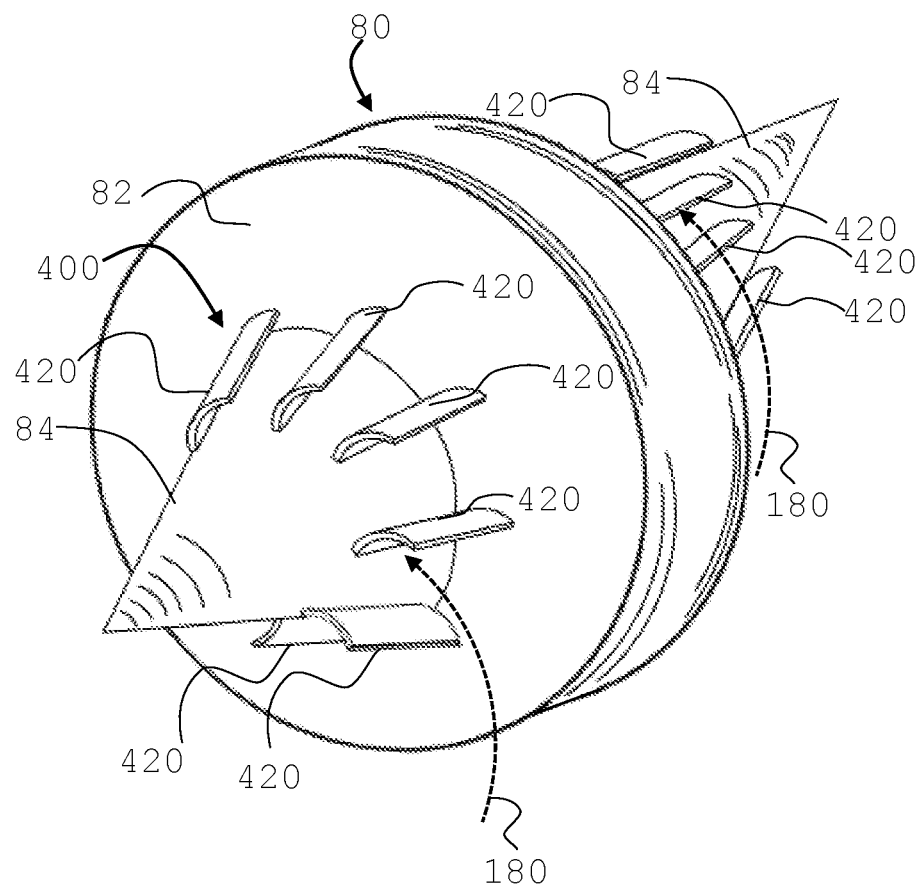
FIG. 11 is a perspective view of one of the embodiments of the rotary valve in disk shape.

Referring to FIG. 11, in one embodiment of the apparatus 10, the main body 82 has a disc shape with turbulators 400 comprising a plurality of impellers 420. The main body 82 of the first rotary valve 80 can be in different rotatable shapes, such as oval, disc, round, or cylinder. Same configuration can be applicable to second rotary valve 115.

Figure 12:
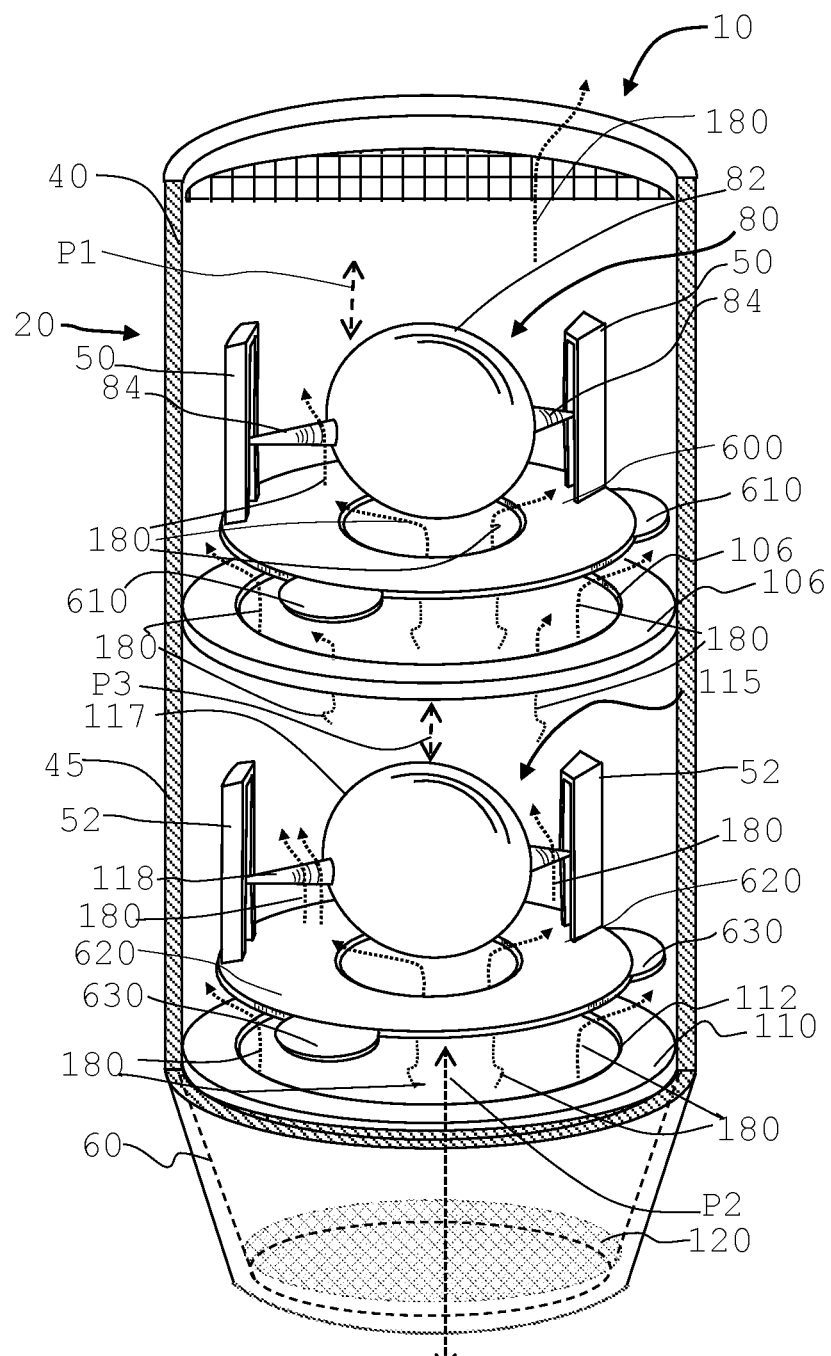
FIG. 12 is a perspective view of one of the embodiments of the invention with guide rails on the valve diaphragm.

Referring to FIG. 12, wherein the first valve diaphragm 600 are made of hard material, wherein the first guide rails 50 can be mounted on the first valve diaphragm 600, wherein the second valve diaphragm 620 are made of hard material, and wherein the second guide rails 52 can be mounted on the second valve diaphragm 620.

Figure 4:
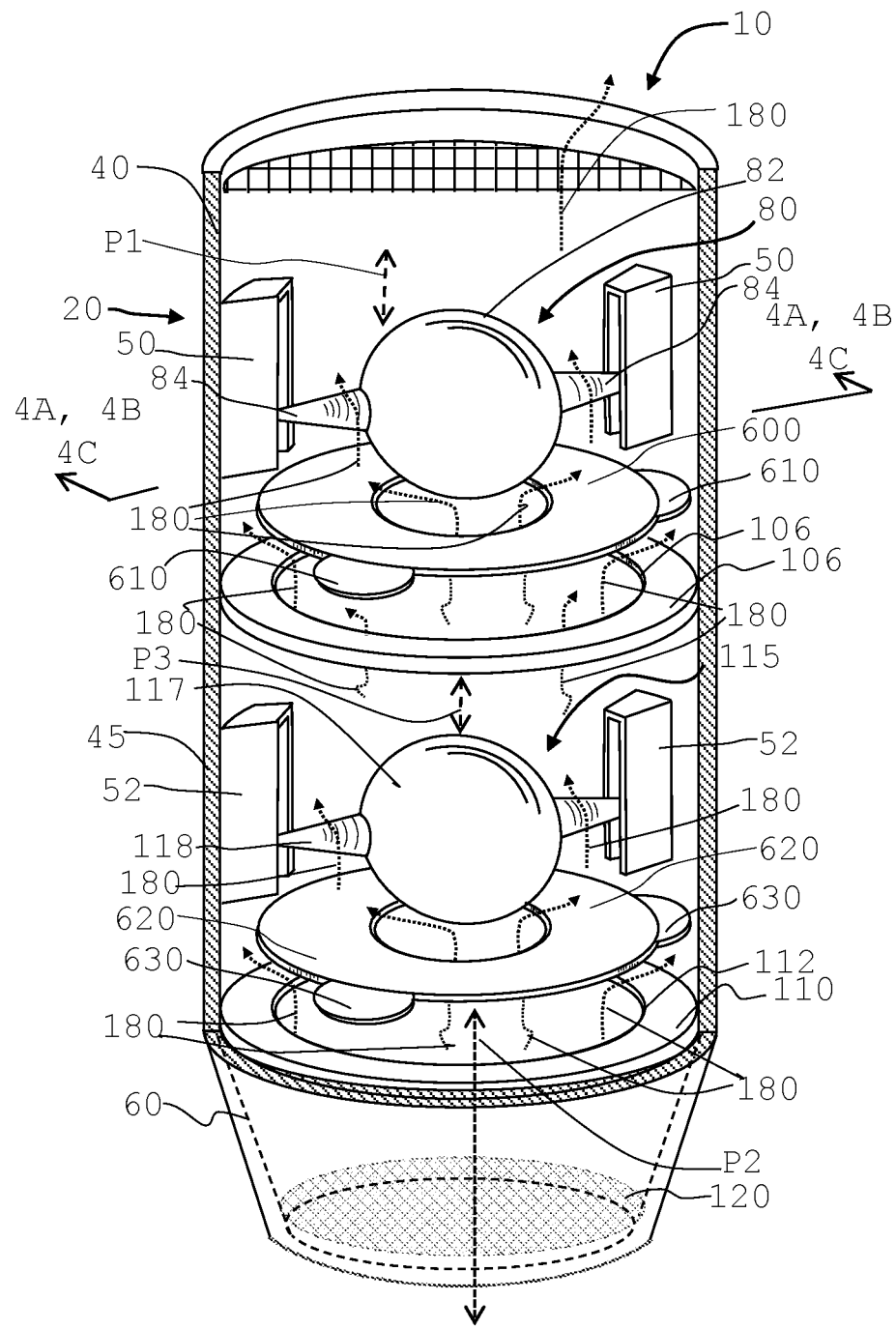
FIG. 4 is a partially sectional view of one of the embodiments of the invention having a rotary valve.
Figure 4A:
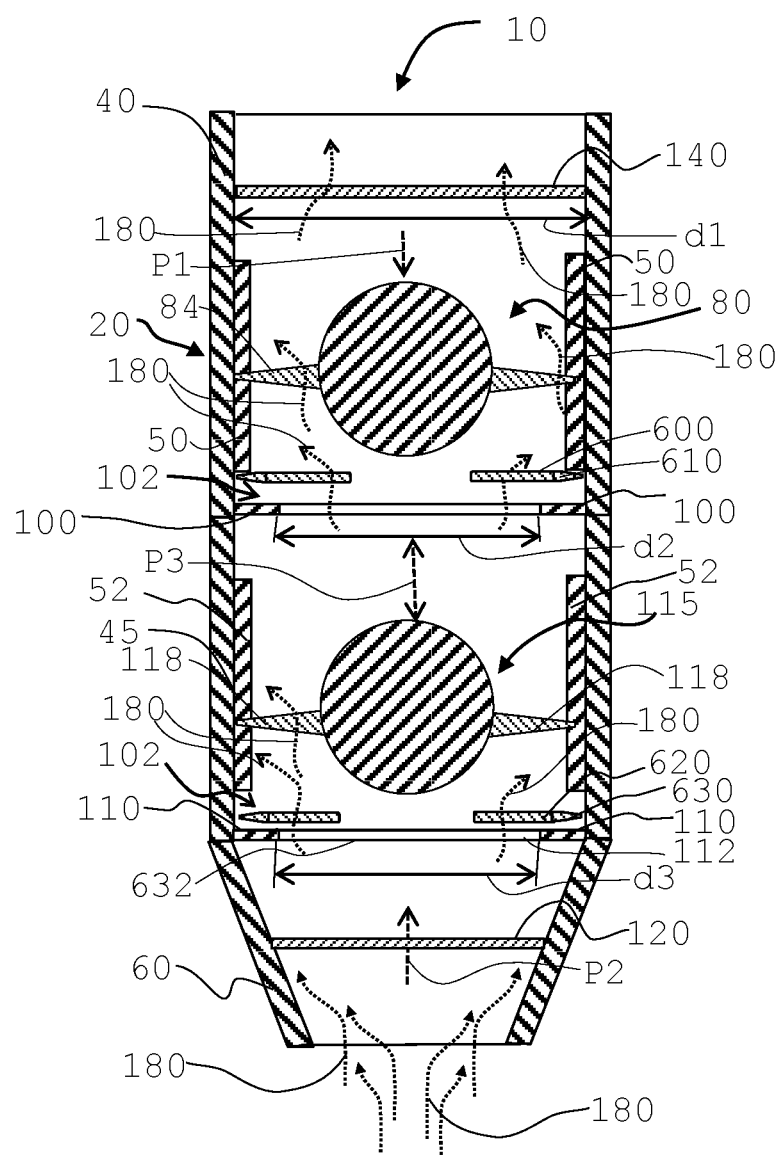
FIG. 4A is a sectional view of one of the embodiments of the invention having two rotary valves both in open position.
Figure 4B:
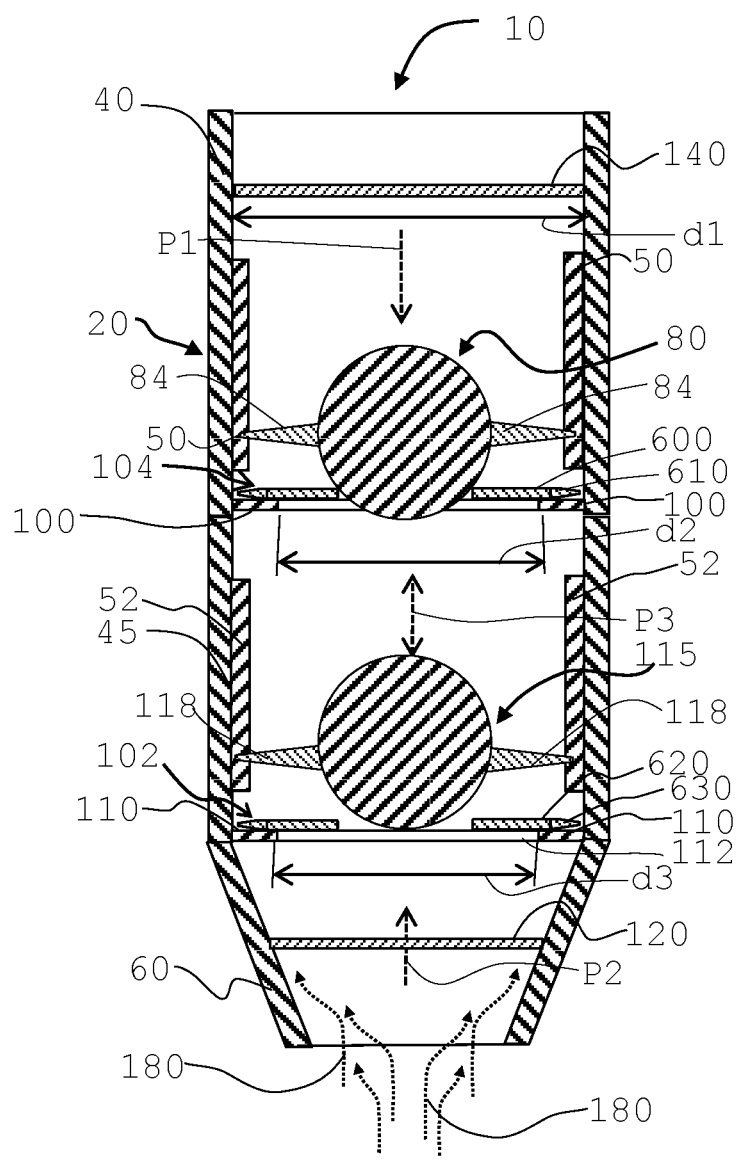
FIG. 4B is a sectional view of one of the embodiments of the invention having two rotary valves, one in open position and one in closed position.
Figure 4C:
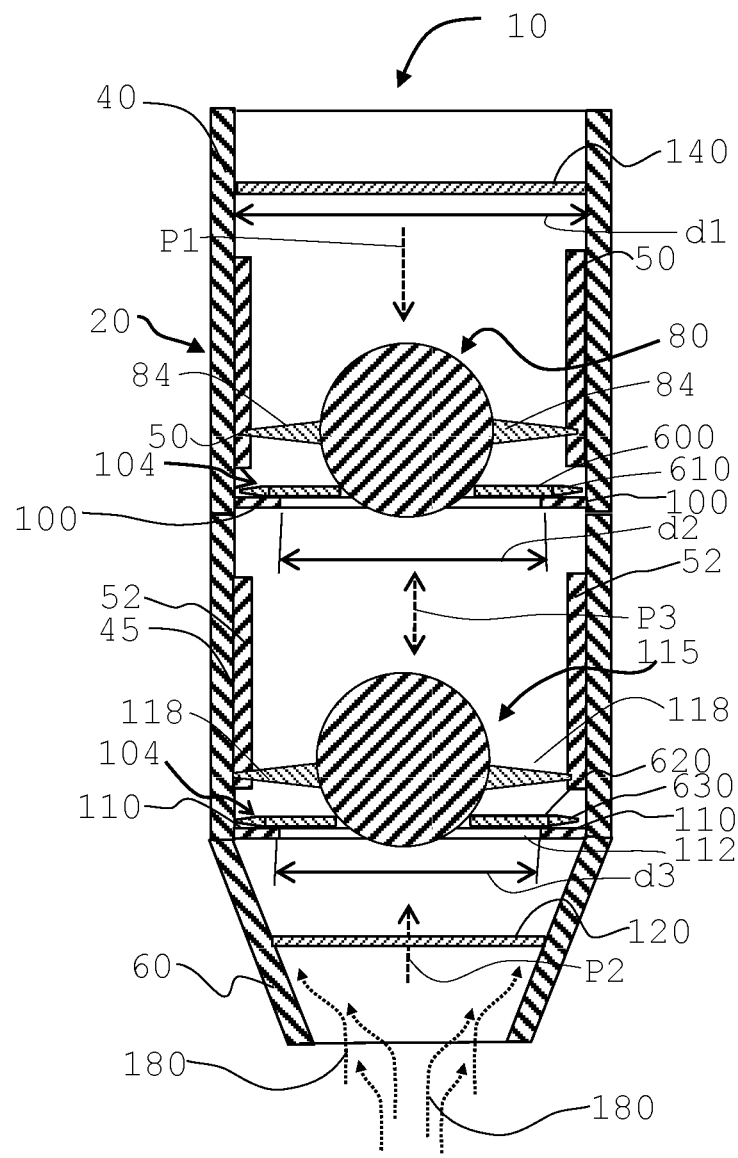
FIG. 4C is a sectional view of one of the embodiments of the invention having two rotary valves both in closed position.
Figure 7:
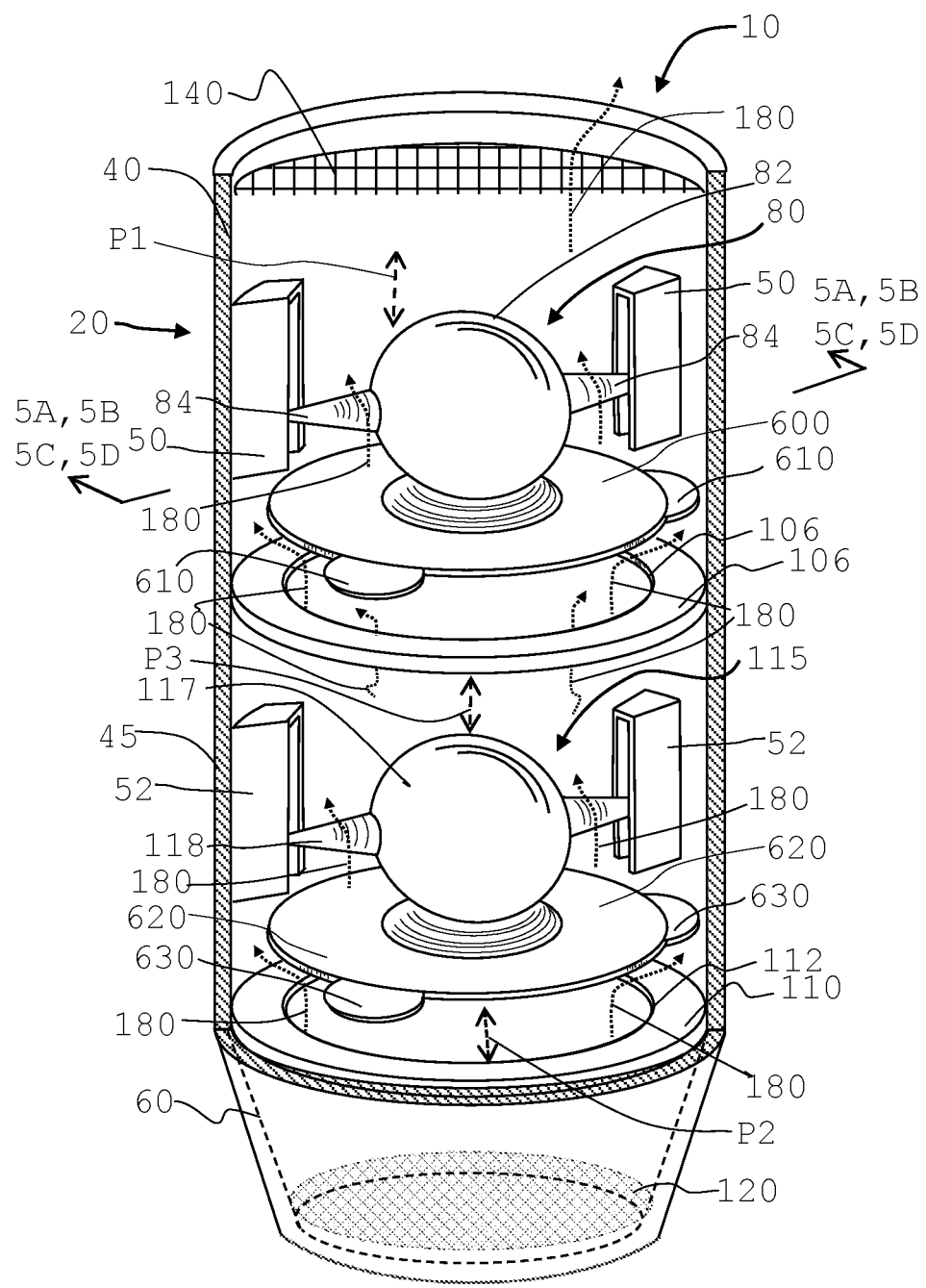
FIG. 7 is a partially sectional view of one of the embodiments of the invention having a membrane.
Figure 7A:
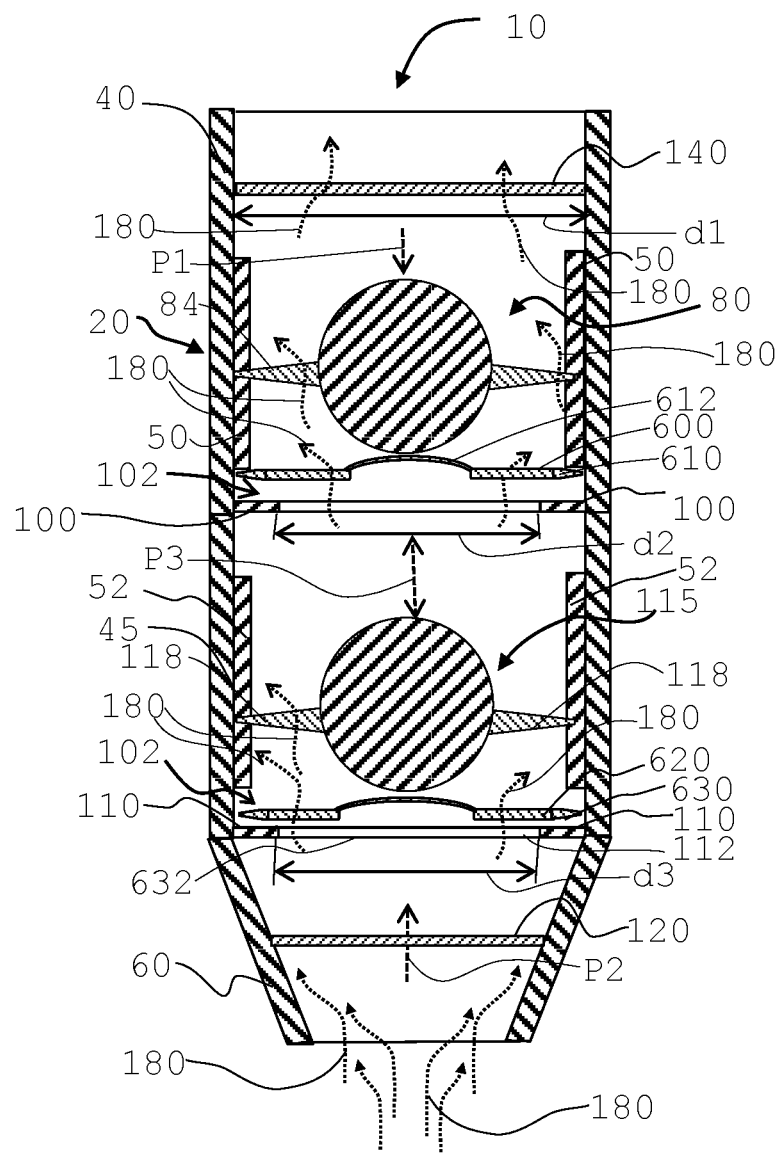
FIG. 7A is a sectional view of one of the embodiments of the invention having a membrane when both first and second rotary valves are in open position.
Figure 7B:
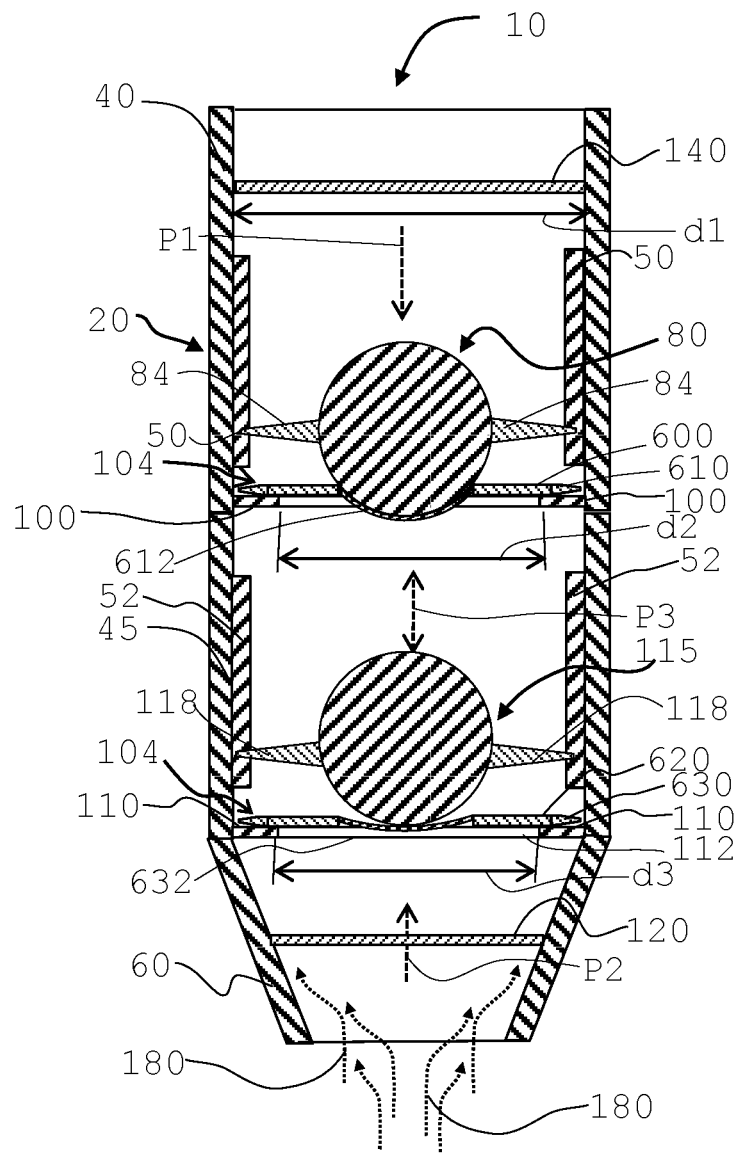
FIG. 7B is a sectional view of one of the embodiments of the invention having a membrane when first rotary valve stretch the membrane more than second rotary valve.
Figure 7C:
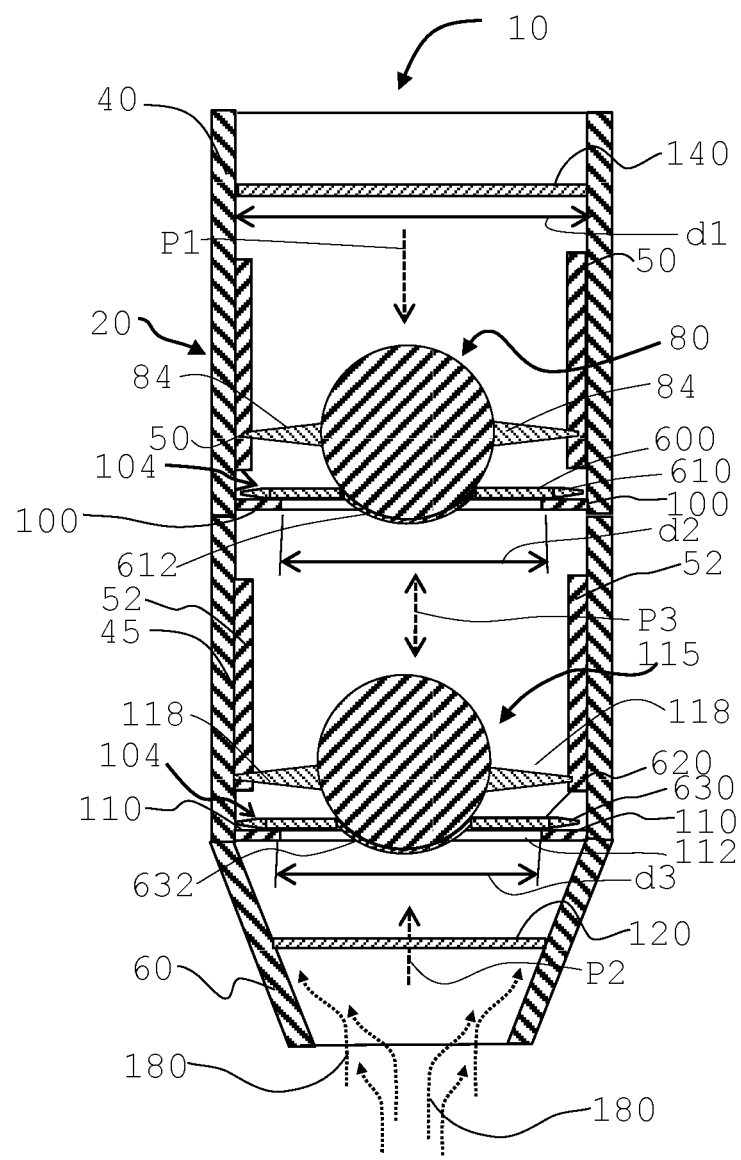
FIG. 7C is a sectional view of one of the embodiments of the invention having a membrane when first rotary valve stretch the membrane substantially equal to the stretch by the second rotary valve
Figure 7D:
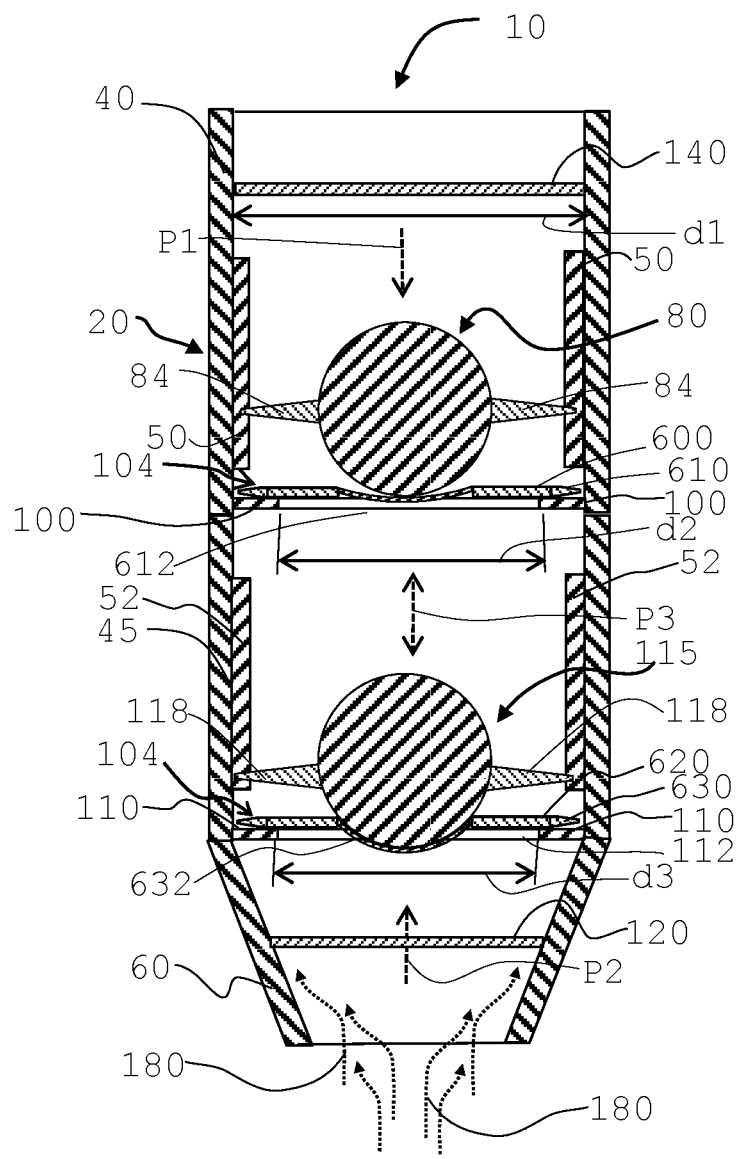
FIG. 7D is a sectional view of one of the embodiments of the invention having a membrane when second rotary valve stretch the membrane more than first rotary valve.
Figure 13:
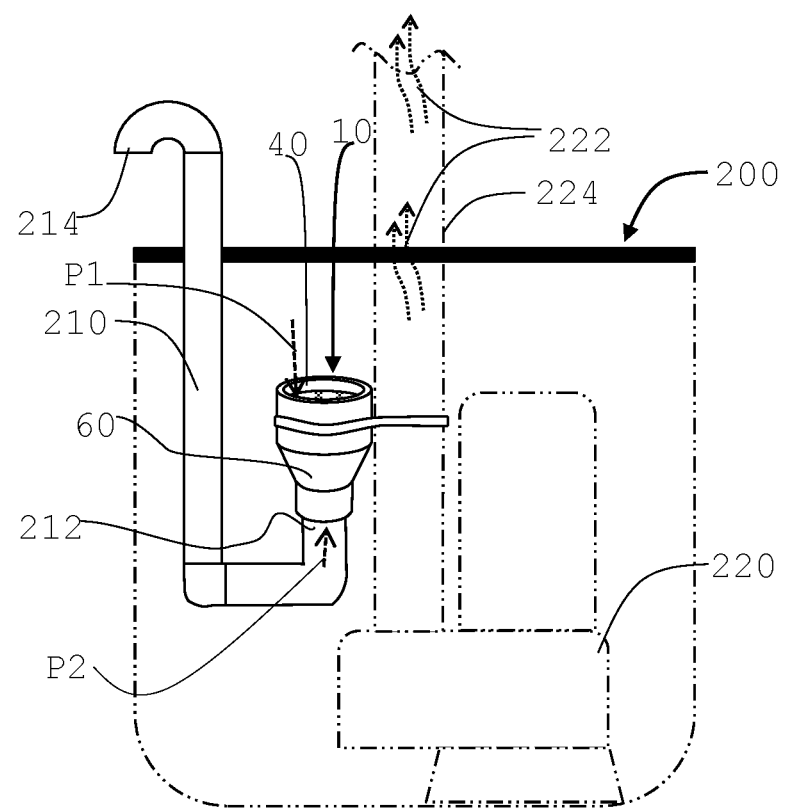
FIG. 13 is a schematic view of one of the embodiments of the invention inside an enclosed environment.

Referring to, FIG. 4, FIG. 7, and FIG. 13, in one embodiment of the apparatus 10, the apparatus 10 is inside an enclosed environment 200, wherein the enclosed environment 200 has an ambient pressure same as the upper flow passage pressure P1 in the enclosed environment 200, wherein the enclosed environment 200 further comprises at least one conduit 210, wherein each at least one conduit 210 has a first end 212 and a second end 214, wherein each of the at least one conduit 210 has the first end 212 connected to the lower flow passage 60 of the apparatus 10 and the second end 214 extends out of the enclosed environment 200, wherein the upper flow passage 40 is opened and adapted to the ambient pressure P1 of the enclosed environment 200, wherein the enclosed environment 200 has at least one pumping device 220, which conveys water and/or air 222 in the enclosed environment 200 to outside the enclosed environment 200, and wherein the at least one pumping device 220 causes a pressure difference to the apparatus 10 when the at least one pumping device 220 conveys water and/or air 222 through at least one pipe 224 out of the enclosed environment 200. The pumping of pumping device 220 will cause a vacuum, negative pressure situation, which causes the upper flow passage pressure P1 in the enclosed environment 200 to drop, and the middle flow passage flow pressure P3 becomes greater than the upper flow passage pressure P1, the weight of the first rotary valve 80, and the weight of the first valve diaphragm 600. As a result, the first rotary valve 80 will be lifted away from the first valve seat 100 and the first valve diaphragm 600. If the lower flow passage pressure P2 in the lower flow passage 60 becomes greater than middle flow passage pressure P3, the weight of the second rotary valve 115, and the second valve diaphragm 620, a lifting force to lift the second rotary valve 115 and the second valve diaphragm 620 off the second valve seat 110 to allow air flow 180 from lower flow passage 60 to upper flow passage 40 and the enclosed environment 200 to release the negative pressure condition. In one preferred embodiment, the apparatus 10 is designed to provide air flow 180 of 12 cubic inch/Second per each millimeter of pipe 224 of the enclosed environment in which at least one pumping device 220 is located. In the enclosed environment where a pump is in operation, a middle flow passage pressure P3 in the middle flow passage 45 is about 8.7 pounds per square inch (60 Kilopascal) greater than the upper flow passage pressure P1, the weight of the first rotary valve 80, and the weight of the first valve diaphragm 600 above the first valve seat 100, wherein the air flow 180 will flow through the housing 20 and the upper flow passage 40 when the first rotary valve 80 is lifted. A lower flow passage pressure P2 in the lower flow passage 60 is about 8.7 pounds per square inch (60 Kilopascal) greater than the middle flow passage pressure P3, the weight of the second rotary valve 115, and the weight of the second valve diaphragm 620 above the second valve seat 110, wherein the air flow 180 will flow through the housing 20 and the middle flow passage 45 when the first rotary valve 80 is lifted. The weight of the first rotary valve 80, the second rotary valve, the first valve diaphragm 600 and the second valve diaphragm 620 can be depended on the pressure difference that the apparatus 10 is designed to control under that situation to stop or allow the air or water passage. In one preferred embodiment of the invention, the first rotary valve 80 and the second rotary valve 115 may have a predetermined weight from about 0.01 ounce to about one pound and one ounce, depending on the application of the invention in different enclosed environment or piping systems that have difference pressures inside the enclosed environment or piping system.

Figure 14:
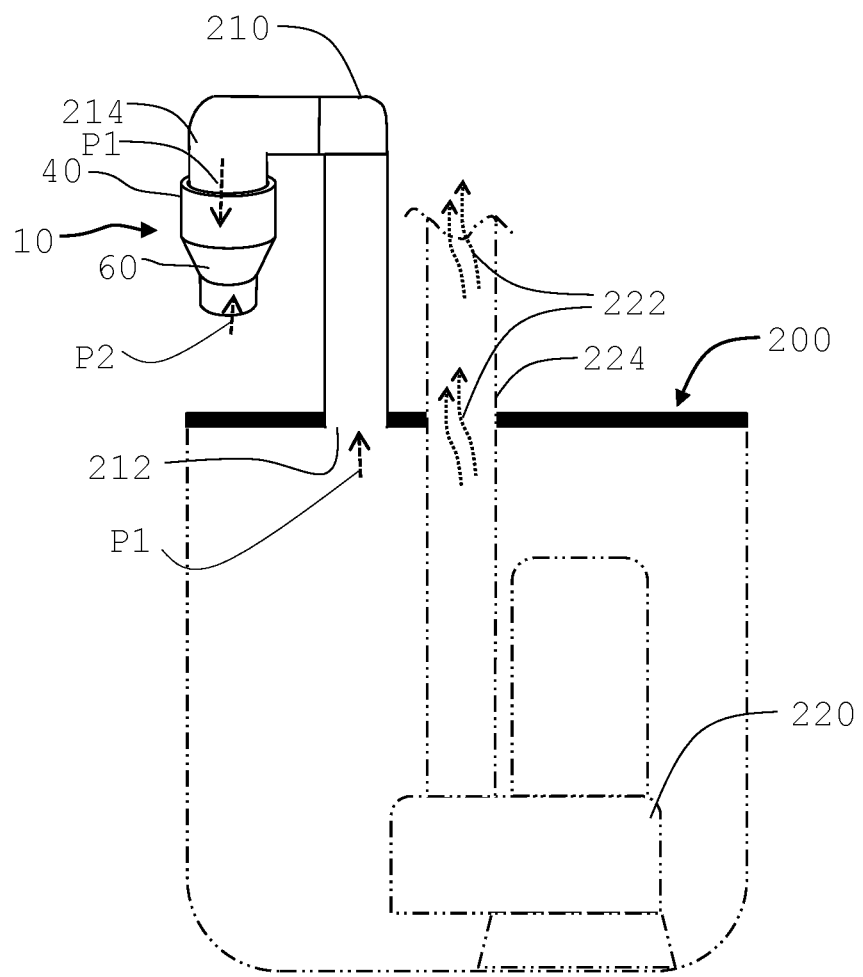
FIG. 14 is a schematic view of one of the embodiments of the invention outside an enclosed environment.

Referring to FIG. 14, in one embodiment of the apparatus 10, the apparatus 10 is outside an enclosed environment 200, wherein the enclosed environment 200 has an ambient pressure in the enclosed environment 200 same as the upper flow passage pressure p1, wherein the enclosed environment 200 further comprises at least one conduit 210, wherein each at least one conduit 210 has a first end 212 and a second end 214, wherein each of the at least one conduit 210 has the first end 212 connected to the upper flow passage 40 of the apparatus 10 and the second end 214 extends into the enclosed environment 200, wherein the upper flow passage 40 is opened and adapted to the ambient pressure P1 of the enclosed environment 200, wherein the enclosed environment 200 has at least one pumping device 220, which conveys water and/or air 222 in the enclosed environment 200 to outside the enclosed environment 200. The pumping of pumping device 220 will cause a vacuum, negative pressure situation, which causes the upper flow passage pressure P1 in the enclosed environment 200 to drop, and the middle flow passage flow pressure P3 becomes greater than the upper flow passage pressure P1, the weight of the first rotary valve 80 and the weight of the first valve diaphragm 600. As a result, the first rotary valve 80 will be lifted away from the first valve seat 100. If the lower flow passage pressure P2 in the lower flow passage 60 becomes greater than middle flow passage pressure P3, the weight of the second rotary valve 115, and the weight of the second valve diaphragm 620, a lifting force to lift the second rotary valve 115 and the second valve diaphragm 620 off the second valve seat 110 to allow air flow 180 from lower flow passage 60 to upper flow passage 40 and the enclosed environment 200 to release the negative pressure condition. In one preferred embodiment, the apparatus 10 is designed to provide at least an air flow 180 of 12 Cubic Inch/Second per each Millimeter of pipe 224 of the enclosed environment where at least one pumping device 220 is located. In the enclosed environment where a pump is in operation, a middle flow passage pressure P3 in the middle flow passage 45 is about 8.7 pounds per square inch (60 Kilopascal) greater than the upper flow passage pressure P1, the weight of the first rotary valve 80, and the weight of the first valve diaphragm 600 above the first valve seat 100, wherein the air flow 180 will flow through the housing 20 and the upper flow passage 40 when the first rotary valve 80 is lifted. A lower flow passage pressure P2 in the lower flow passage 60 is about 8.7 pounds per square inch (60 Kilopascal) greater than the middle flow passage pressure P3, the weight of the second rotary valve 115, and the weight of the second valve diaphragm 620 above the second valve seat 110, wherein the air flow 180 will flow through the housing 20 and the middle flow passage 45 when the first rotary valve 80 is lifted.

Figure 15:
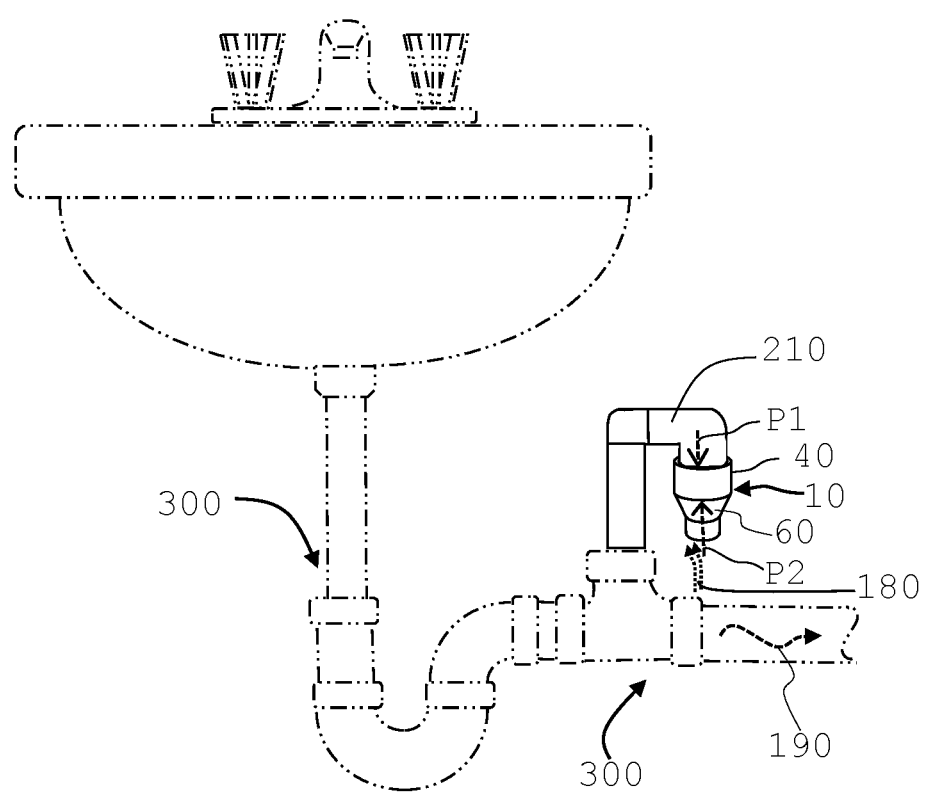
FIG. 15 is a schematic view of one of the embodiments of the invention installed in a piping system.
Figures 16, 17:
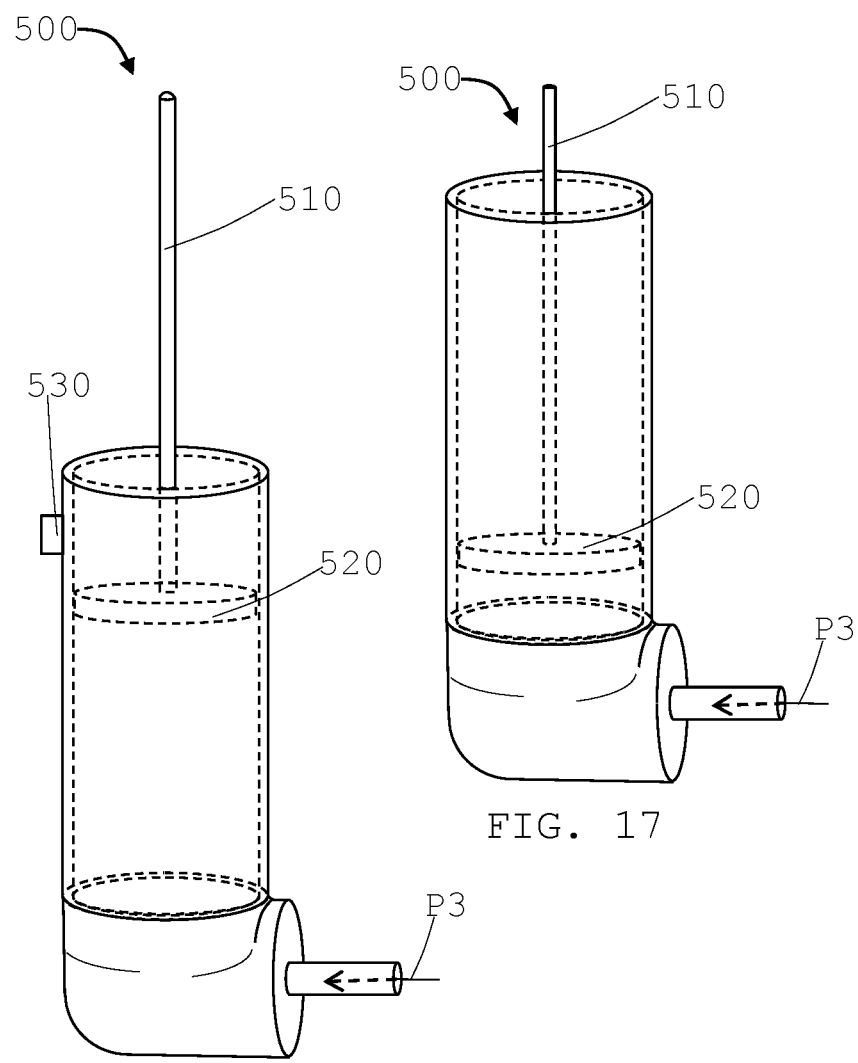
FIG. 16 is a perspective view of one of the embodiments of the invention with pressure indicator showing high pressure status.
FIG. 17 is a perspective view of one of the embodiments of the invention with pressure indicator showing low pressure status.
Figure 18:
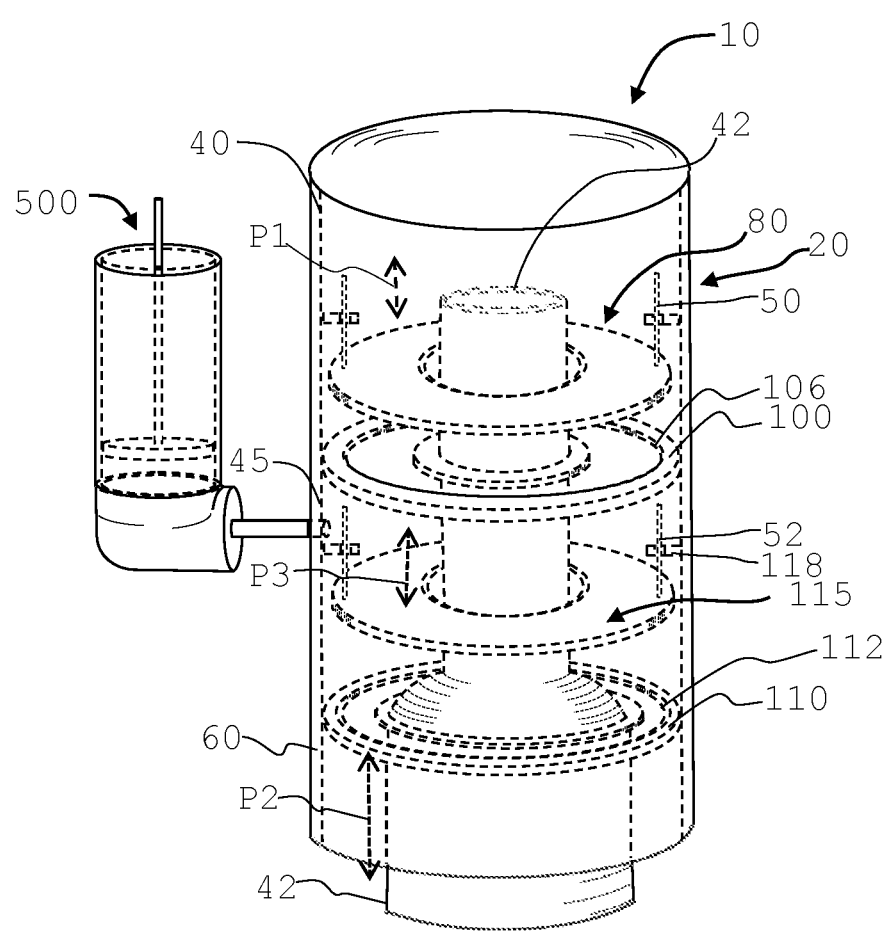
FIG. 18 is a perspective view of one of the embodiments of the invention with pressure indicator installed and communicated with middle flow passage pressure.
Figure 19:
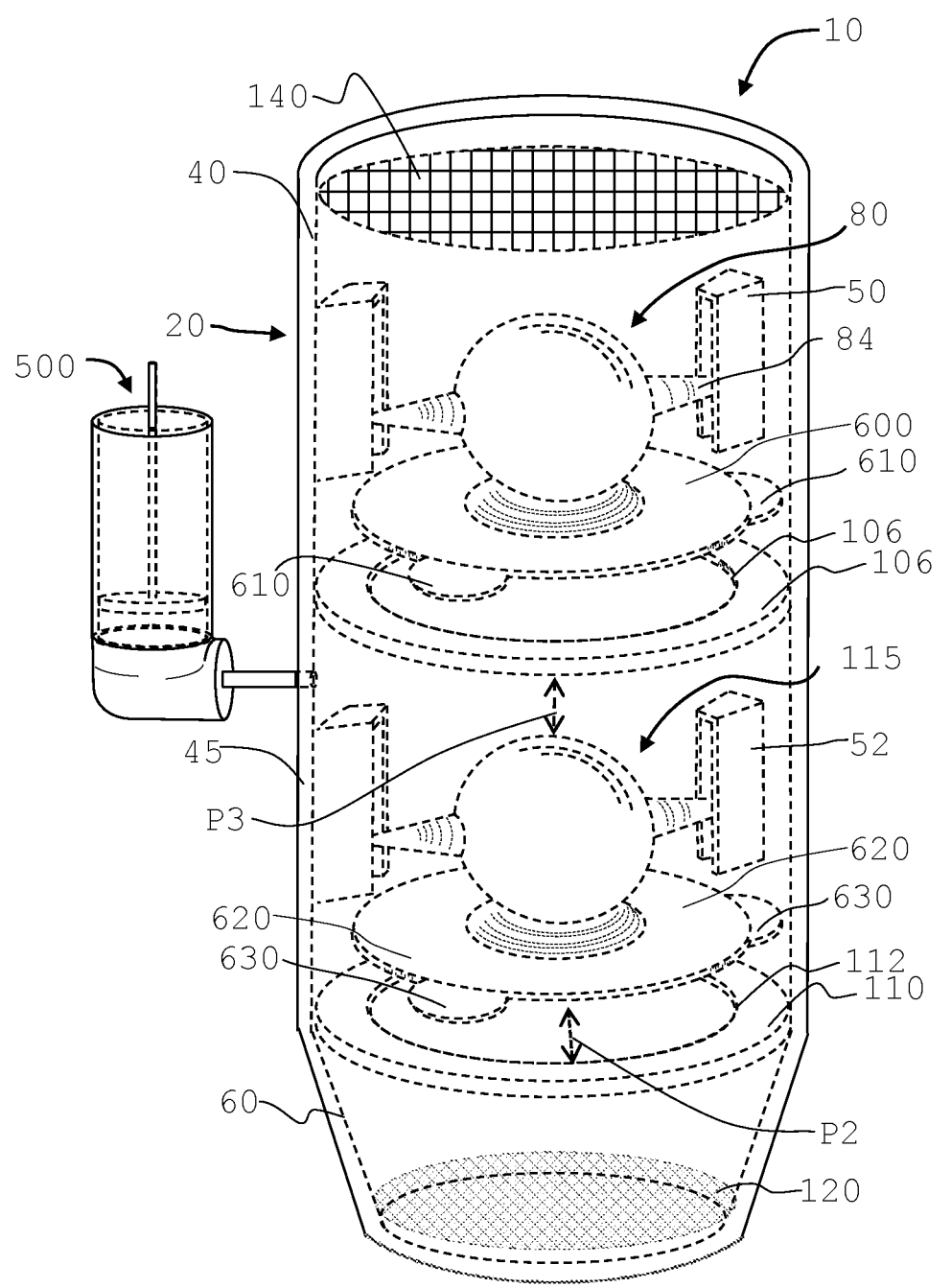
FIG. 19 is a perspective view of another one of the embodiments of the invention with pressure indicator installed and communicated with middle flow passage pressure.
Figure 20:
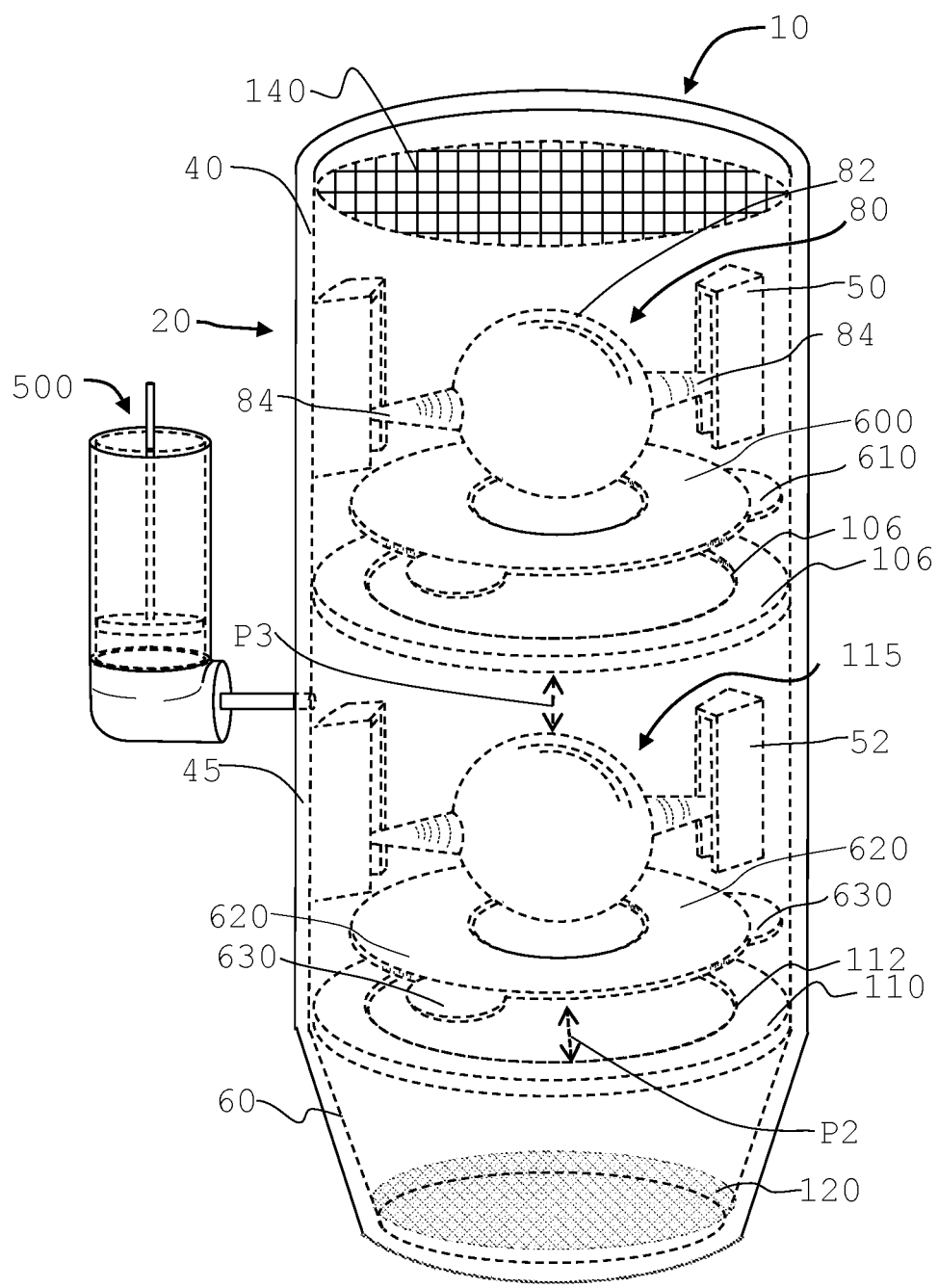
FIG. 20 is a perspective view of another one of the embodiments of the invention with pressure indicator installed and communicated with middle flow passage pressure.

Referring to FIG. 15, in one embodiment of the apparatus 10, the apparatus 10 is installed to a piping system 300, which is one kind of an enclosed environment, wherein the piping system 300 wherein the piping system 300 further comprises at least one conduit 210, wherein each at least one conduit 210 connected to the upper flow passage 40 of the apparatus 10, wherein the upper flow passage 40 has an upper flow passage pressure P1 adapted to the ambient pressure of the piping system 300, wherein a draining flow 190 is drained from the piping system 300 causing a negative pressure situation, which causes the upper flow passage pressure P1 in the piping system 300 to drop, and the middle flow passage flow pressure P3 becomes greater than the upper flow passage pressure P1, the weight of the first rotary valve 80 and the weight of the first valve diaphragm 600. As a result, the first rotary valve 80 and the first valve diaphragm 600 will be lifted away from the first valve seat 100. If the lower flow passage pressure P2 in the lower flow passage 60 becomes greater than middle flow passage pressure P3, the weight of the second rotary valve 115 and the weight of the second valve diaphragm 620, a lifting force to lift the second rotary valve 115 and the second valve diaphragm 620 off the second valve seat 110 to allow air flow 180 from lower flow passage 60 to upper flow passage 40 and the piping system 300 to release the negative pressure condition. In the piping system, the pressure difference between the middle flow passage pressure P3 and the upper flow passage pressure P1 or the pressure difference between the middle flow passage pressure P3 and the lower flow passage pressure P2 is generally about 0.05 inches of water column to 2 inches of water column (12.45 Pascal to 498.18 Pascal), but the pressure difference may vary with the scale of the piping system. The air admittance requirement for air flow 180 into the piping system 300 is generally 1 cubic feet per minute or 0.47 litter per second, but it may vary with the scale of the piping system 300.

Referring to FIG. 16, FIG. 17, FIG. 18, FIG. 19, and FIG. 20, in one embodiment of the invention, the apparatus 10, further comprise a pressure indicator 500 responsive to the middle flow passage pressure P3, wherein the pressure indicator 500 is visible on an external surface of the housing 20, and wherein the pressure indicator 500 shows a pressure status of the middle flow passage pressure P3. When the middle flow passage pressure P3 is high (FIG. 16), the middle flow passage pressure P3 will push a piston 520 of the pressure indicator 500 up, which will elevate an indicator rod 510 to indicator a high pressure status. When the middle flow passage pressure P3 is low (FIG. 17), the middle flow passage pressure P3 will retract a piston 520 of the pressure indicator 500 down, which will lower an indicator rod 510 to indicator a low pressure status. The apparatus 10 can further comprises a signal transmitter 530 to transmit the pressure status of the pressure indicator 500. Also noted is that the pressure indicator 500 can be other types of pressure gauges.

Figure 21:
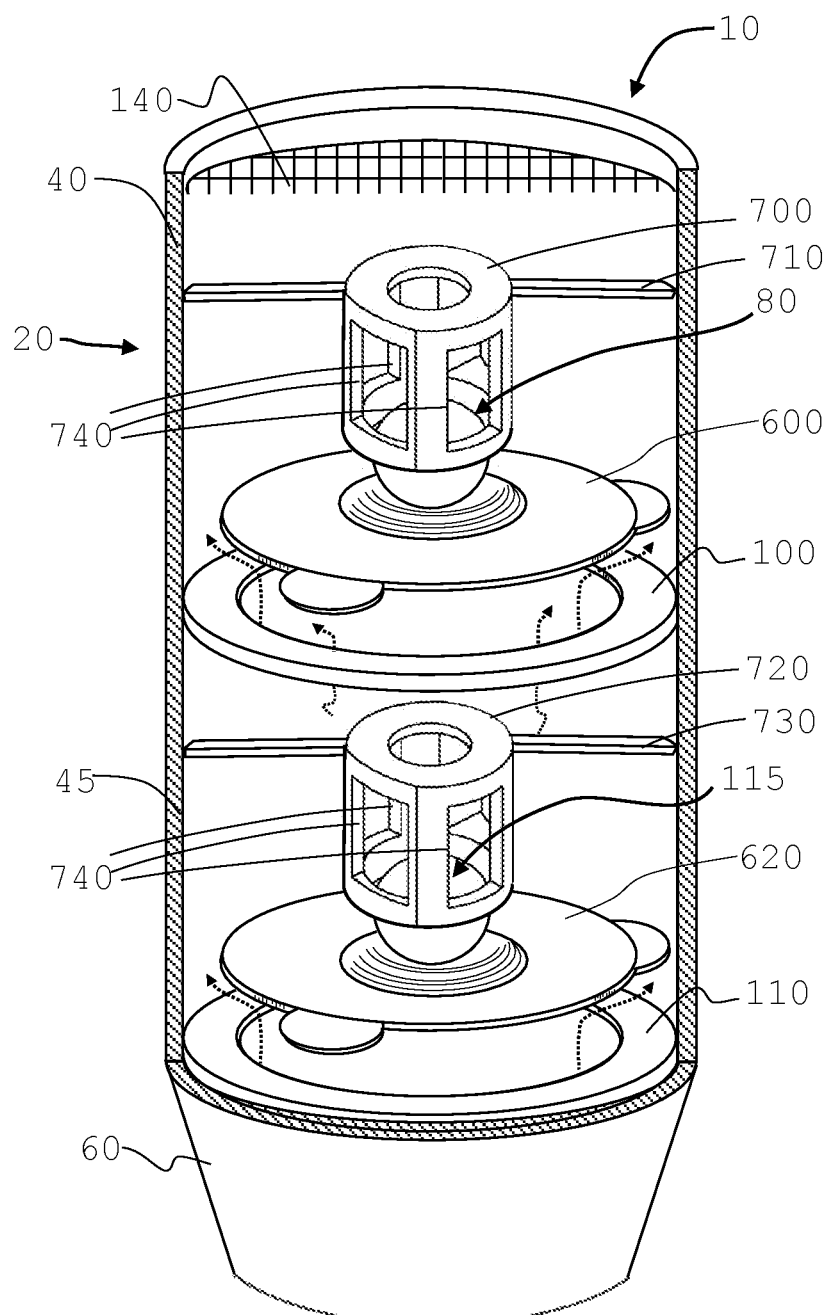
FIG. 21 is a partially sectional view of one of the embodiments of the invention with cages.
Figure 22:
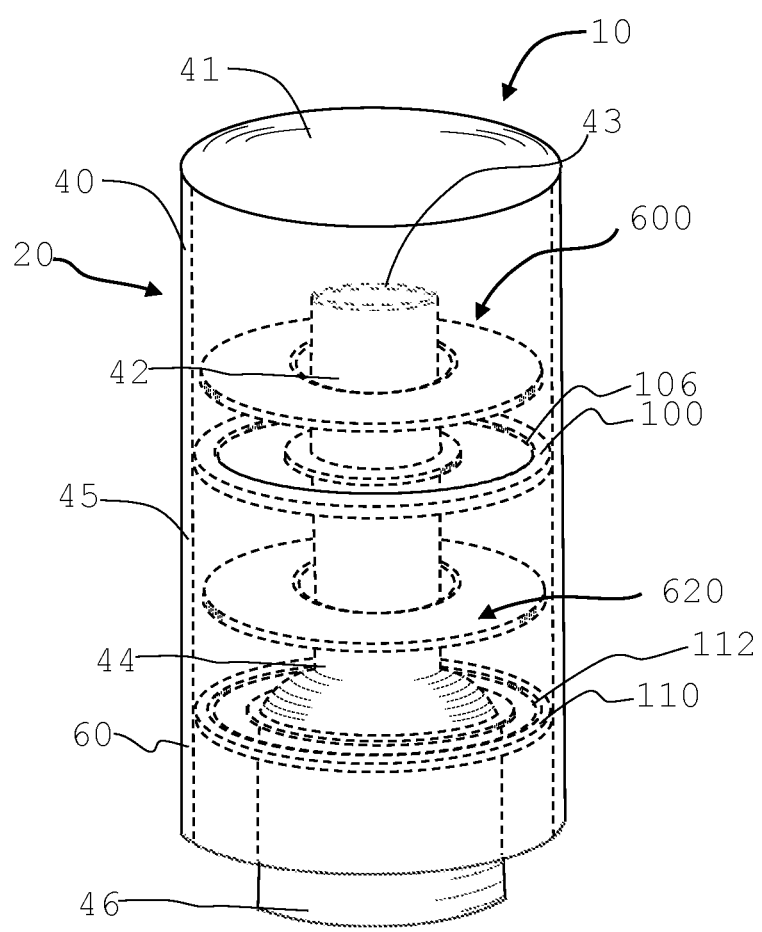
FIG. 22 is a perspective view of another one of the embodiments of the invention.
Figure 23:
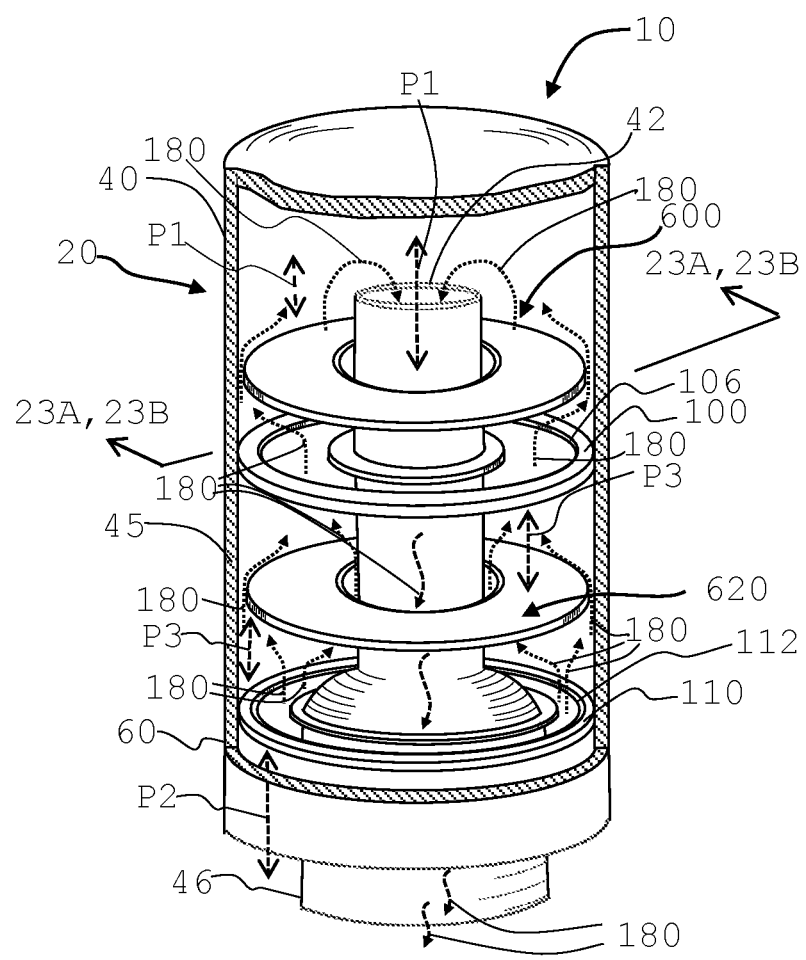
FIG. 23 is a partially sectional view of another one of the embodiments of the invention.
Figure 23A:
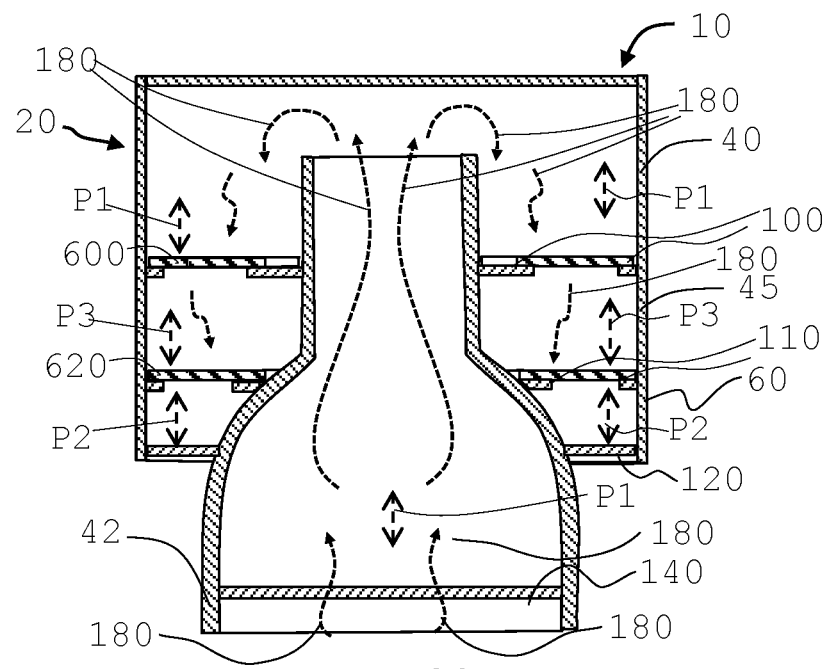
FIG. 23A is a sectional view of another one of the embodiments of the invention when valve diaphragms are in closed position
Figure 23B:
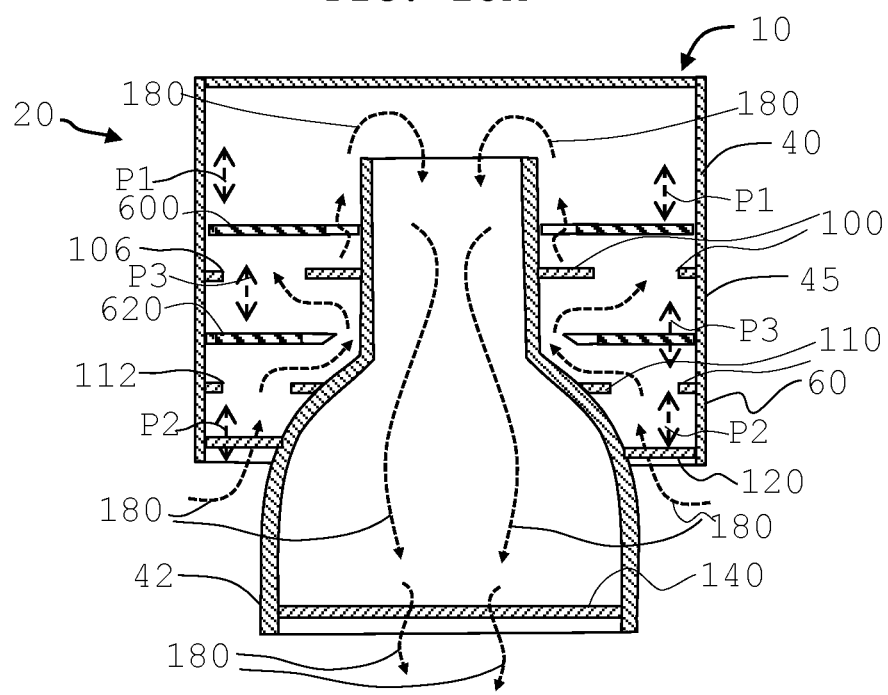
FIG. 23B is a sectional view of another one of the embodiments of the invention when valve diaphragms are in open position

Referring to FIG. 21, in one embodiment of the invention, the apparatus 10, further comprises a first cage 700 and a second cage 720, wherein a plurality of openings 740 is formed on each of the first cage 700 and second cage 720, wherein the first cage 700 further comprises at least one support rod 710 having one end mounted to the first cage 700 and another end mounted to the housing 20, wherein the second cage 720 further comprises at least one support rod 730 having one end mounted to the second cage 720 and another end mounted to the housing 20, wherein the first cage 700 is configured and positioned to allow the first rotary valve 80 to move inside the first cage 700 and above the first valve diaphragm 600 without falling out of the first cage 700, and wherein the second cage 720 is configured and positioned to allow the second rotary valve 115 to move inside the second cage 720 and above the second valve diaphragm 620 without falling out of the second cage 720.

Referring to FIG. 22, FIG. 23, FIG. 23A, and FIG. 24B, in one embodiment of the invention, the apparatus 10 comprises an housing 20 having an upper flow passage 40, a middle flow passage 45, a lower flow passage 60, wherein the upper flow passage 40 has a sealed top end 41, and wherein the upper flow passage 40 is above the middle flow passage 45, wherein the middle flow passage 45 is above the lower flow passage 60, wherein the lower flow passage 60 is communicated with an ambient environment, wherein an upper flow passage pressure P1 exists in the upper flow passage 40, wherein a middle flow passage pressure P3 exists in the middle flow passage 45, and wherein a lower flow passage pressure P2 exists in the lower flow passage; (b) an inner pipe 42, wherein the inner pipe has a top end 43, a body 44, and a bottom end 46 opposite to the top end 43, wherein the inner pipe 42 is axially disposed inside the housing 20, wherein the top end 43 communicates with the upper flow passage 40, wherein bottom end 46 communicates with an enclosed environment 200 or a piping system 300; (c) a first valve seat 100, wherein the first valve seat 100 is between the upper flow passage 40 and the middle flow passage 45, wherein the first valve seat 100 is ring-shape circumferentially disposed between the inner pipe 42 and the housing 20, wherein a first opening 106 is formed through the first valve seat 100; (d) a first valve diaphragm 600 inside the housing, wherein the first valve diaphragm 600 has an inner circumference 606 and an outer circumference 602, wherein the first valve diaphragm 600 is disposed between the housing 20 and the inner pipe 42, wherein the first valve diaphragm 600 is dimensioned and configured to cover the first opening 106 formed through the first valve seat 100, wherein the first valve diaphragm 600 has a predetermined weight, wherein the first valve diaphragm 600 can move up and down inside the upper flow passage 40 and above the first valve seat 100, wherein the first valve diaphragm 600 is lifted away from the first valve seat 100 when the middle flow passage pressure P3 is greater than the upper flow passage pressure P1 and the predetermined weight of the first valve diaphragm 600, wherein the first valve diaphragm 600 is disposed on the first opening 106 on the first valve seat 100 when the middle flow passage pressure P3 is less than or equal to the upper flow passage pressure P1 and the predetermined weight of the first valve diaphragm 600, wherein the first valve diaphragm 600 is in an open position 102 when the first valve diaphragm 600 is lifted away from the first valve seat 100 allowing an air flow 180 from middle flow passage 45 into the upper flow passage 40, and wherein the first valve diaphragm 600 is in a closed position 104 when the first valve diaphragm 600 is disposed on the first opening 106 on the first valve seat 100 preventing the air flow 180 from middle flow passage 45 flowing into the upper flow passage 40; (e) a second valve seat 110, wherein the second valve seat 110 is between the middle flow passage 45 and the lower flow passage 60, wherein the second valve seat 110 is ring-shape circumferentially disposed between the inner pipe 42 and the housing 20, wherein a second opening 112 is formed through the second valve seat 110; and (f) a second valve diaphragm 620 inside the housing 20, wherein the second valve diaphragm 620 has an inner circumference 626 and an outer circumference 622, wherein the second valve diaphragm 620 is disposed between the housing 20 and the inner pipe 42, wherein the second valve diaphragm 620 is dimensioned and configured to cover the second opening 112 formed through the second valve seat 110, wherein the second valve diaphragm 620 has a predetermined weight, and wherein the second valve diaphragm 620 can move up and down inside the middle flow passage 45 and above the second valve seat 110, wherein the second valve diaphragm 620 is lifted away from the second valve seat 110 when the lower flow passage pressure P2 is greater than the middle flow passage pressure P3 and the predetermined weight of the second valve diaphragm 620, wherein the second valve diaphragm 620 is disposed on the second opening 112 on the second valve seat 110 when the lower flow passage pressure P2 is less than or equal to the middle flow passage pressure P3 and the predetermined weight of the second valve diaphragm 620, wherein the second valve diaphragm 620 is in an open position 102 when the second valve diaphragm 620 is lifted away from the second valve seat 110 allowing an air flow 180 from lower flow passage 60 into the middle flow passage 45, and wherein the second valve diaphragm 620 is in a closed position 104 when the second valve diaphragm 620 is disposed on the second opening 112 on the second valve seat 110 preventing the air flow 180 from lower flow passage 60 flowing into the middle flow passage 45.

Referring to FIG. 24, the first valve diaphragm 600 and the second valve diaphragm 620 can have a plurality of protruding members 610 and a plurality of protruding members 630 extending radially out from the outer circumferences of first valve diaphragm 600 and the second valve diaphragm 620, respectively.

Referring to FIG. 25, the first valve diaphragm 600 and the second valve diaphragm 620 can have a plurality of protruding members 610 and a plurality of protruding members 630 extending radially out from the inner circumferences of first valve diaphragm 600 and the second valve diaphragm 620, respectively.

What claimed is:

1. An apparatus to allow or stop an air flow into an enclosed environment or piping system, comprising:
   (a) a housing having an upper flow passage, a middle flow passage, a lower flow passage, wherein said upper flow passage is above said middle flow passage, wherein said middle flow passage is above said lower flow passage, wherein an upper flow passage pressure exists in said upper flow passage, wherein a middle flow passage pressure exists in said middle flow passage, and wherein a lower flow passage pressure exists in said lower flow passage;
   (b) a first valve seat, wherein said first valve seat is between said upper flow passage and said middle flow passage, and wherein a first opening is formed on said first valve seat;
   (c) a first valve diaphragm, wherein said first valve diaphragm is dimensioned and configured to be inside said upper flow passage, wherein said first valve diaphragm is configured and dimensioned to substantially cover said first opening of said first valve seat, wherein said first valve diaphragm has an outer circumference, wherein said first valve diaphragm further comprises a plurality of protruding members extending radially from said outer circumference, wherein said first valve diaphragm has a predetermined weight, wherein said first valve diaphragm can move upwardly and downwardly above said first valve seat, wherein said first valve diaphragm is moved upwardly above said first valve seat when said middle flow passage pressure is greater than the upper flow passage pressure and said predetermined weight of said first valve diaphragm, and wherein said first valve diaphragm covers said first opening when said middle flow passage pressure is less than or equal to the upper flow passage pressure and said predetermined weight of said first valve diaphragm;
   (d) a second valve seat, wherein said second valve seat is between said middle flow passage and said lower flow passage, and wherein a second opening is formed on said second valve seat; and
   (e) a second valve diaphragm, wherein said second valve diaphragm is dimensioned and configured to be inside said middle flow passage, wherein said second valve diaphragm is configured and dimensioned to substantially cover said second opening of said second valve seat, wherein said second valve diaphragm has an outer circumference, wherein said second valve diaphragm further comprises a plurality of protruding members extending radially from said outer circumference, wherein said second valve diaphragm has a predetermined weight, wherein said second valve diaphragm can move upwardly and downwardly above said second valve seat, wherein said first valve diaphragm is in an open position when said first valve diaphragm is moved away from said first valve seat, wherein said first valve diaphragm is biased towards a closed position by said predetermined weight of said first valve diaphragm so that said first valve diaphragm is disposed on said first valve seat, wherein said second valve diaphragm is in an open position when said second valve diaphragm is moved away from said second valve seat, wherein said second valve diaphragm is biased towards a closed position by said predetermined weight of said second valve diaphragm so that said second valve diaphragm is disposed on said second valve seat, wherein said second valve diaphragm is moved upwardly above said second valve seat when said lower flow passage pressure is greater than the middle flow passage pressure and said predetermined weight of said second valve diaphragm, and wherein said second valve diaphragm covers said second opening when said lower flow passage pressure is less than or equal to the middle flow passage pressure and said predetermined weight of said second valve diaphragm.

2. The apparatus of claim 1, further comprising:
   (a) a first rotary valve inside said housing, wherein said first rotary valve further comprises a main body, wherein said first rotary valve has a predetermined weight, wherein said first rotary valve is within said upper flow passage and is above said first valve diaphragm, and wherein said first rotary valve can move upwardly and downwardly inside said upper flow passage and above said first valve diaphragm; and
   (b) a second rotary valve inside said housing, wherein said second rotary valve further comprises a main body, wherein said second rotary valve has a predetermined weight, wherein said second rotary valve is within said middle flow passage and is above said second valve diaphragm, and wherein said second rotary valve can move upwardly and downwardly inside said middle flow passage and above said second valve diaphragm.

3. The apparatus of claim 2, wherein a first center opening is formed through said first valve diaphragm, wherein said first center opening is configured and dimensioned to engage said main body of said first rotary valve and to prevent said first rotary valve from passing through said first center opening, wherein a second center opening is formed through said second valve diaphragm, and wherein said second center opening is configured and dimensioned to engage said main body of said second rotary valve and to prevent said second rotary valve from passing through said second center opening.

4. The apparatus of said claim 3, wherein said first valve diaphragm is made of hard material, wherein an inner circumference of said first center opening is flushed with soft material, wherein said second valve diaphragm is made of hard material, and wherein an inner circumference of said second center opening is flushed with soft material.

5. The apparatus of said claim 3, wherein said first valve diaphragm is made of flexible, resilient material, and wherein said second valve diaphragm is made of flexible, resilient material.

6. The apparatus of claim 2, wherein a first center opening is formed through said first valve diaphragm, wherein said first center opening is configured and dimensioned to engage said main body of said first rotary valve and to prevent said first rotary valve from passing through said first center opening, wherein a second center opening is formed through said second valve diaphragm, wherein said second center opening is configured and dimensioned to engage said main body of said second rotary valve and to prevent said second rotary valve from passing through said second center opening, wherein said first valve diaphragm further comprises a first membrane covering said first center opening, wherein said first membrane is flexible to be stretched upwardly and downwardly, wherein said first rotary valve pushes down said first membrane when said first rotary valve is disposed on said first membrane, wherein said second valve diaphragm further comprises a second membrane covering said second center opening, wherein said second membrane is flexible to be stretched upwardly and downwardly, and wherein said second rotary valve pushes down said second membrane when said second rotary valve is disposed on said second membrane.

7. The apparatus of claim 2, wherein said main body of said first rotary valve is hollow and filled with Argon gas, and wherein said main body of said second rotary valve is hollow and filled with Argon gas.

8. The apparatus of claim 2, further comprising:
(a) two first guides mounted to said main body of said first rotary valve, wherein said two first guides are opposite to each other;
(b) two first guide rails, wherein said two first guide rails are disposed inside upper flow passage for guiding said first rotary valve between an open position and a closed position, wherein each of said two first guides of said first rotary valve are disposed in each of said two first guide rails, wherein said two first guides move freely in said two first guide rails, and wherein said two first guide rails are attached to said housing;
(c) two second guides mounted to said main body of said second rotary valve, wherein said two second guides are opposite to each other; and
(d) two second guide rails, wherein said two second guide rails are disposed inside middle flow passage for guiding said second rotary valve between an open position and a closed position, wherein each of said two second guides of said second rotary valve are disposed in each of said two second guide rails, wherein said two second guides move freely in said two second guide rails, and wherein said two second guide rails are attached to said housing.

9. The apparatus of claim 8, wherein said first rotary valve further comprises two turbulators, wherein each of said two turbulators comprises a plurality of impellers mounted to said main body of said first rotary valve, wherein said plurality of impellers are arranged in a circle around each of said two first guides of said first rotary valve, wherein each of said two turbulators are opposite to each other, wherein said two turbulators rotate said first rotary valve when said air flow from said middle flow passage pushes said plurality of impellers, wherein said second rotary valve further comprises two turbulators, wherein each of said two turbulators comprises a plurality of impellers mounted to said main body of said second rotary valve, wherein said plurality of impellers are arranged in a circle around each of said two second guides of said second rotary valve, wherein each of said two turbulators are opposite to each other, and wherein said two turbulators rotate said second rotary valve when said air flow from said lower flow passage pushes said plurality of impellers.

10. The apparatus of claim 8, wherein said first rotary valve further comprises two turbulators, wherein each of said two turbulators comprises a plurality of impellers radially mounted to each of said two first guides, wherein said two turbulators rotate said first rotary valve when said air flow from said middle flow passage pushes said plurality of impellers, wherein said second rotary valve further comprises two turbulators, wherein each of said two turbulators comprises a plurality of impellers radially mounted to each of said two second guides, and wherein said two turbulators rotate said second rotary valve when said air flow from said lower flow passage pushes said plurality of impellers.

11. The apparatus of claim 2, further comprising:
(a) two first guides mounted to said main body of said first rotary valve, wherein said two first guides are opposite to each other;
(b) two first guide rails, wherein said two first guide rails are disposed inside upper flow passage for guiding said first rotary valve between an open position and a closed position, wherein each of said two first guides of said first rotary valve are disposed in each of said two first guide rails, wherein said two first guides move freely in said two first guide rails, and wherein said two first guide rails are attached to said first valve diaphragm;
(c) two second guides mounted to said main body of said second rotary valve, wherein said two second guides are opposite to each other; and
(d) two second guide rails, wherein said two second guide rails are disposed inside middle flow passage for guiding said second rotary valve between an open position and a closed position, wherein each of said two second guides of said second rotary valve are disposed in each of said two second guide rails, wherein said two second guides move freely in said two second guide rails, and wherein said two second guide rails attached to said second valve diaphragm.

12. The apparatus of claim 11, wherein said first rotary valve further comprises two turbulators, wherein each of said two turbulators comprises a plurality of impellers mounted to said main body of said first rotary valve, wherein said plurality of impellers are arranged in a circle around each of said two first guides of said first rotary valve, wherein each of said two turbulators are opposite to each other, wherein said two turbulators rotate said first rotary valve when said air flow from said middle flow passage pushes said plurality of impellers, wherein said second rotary valve further comprises two turbulators, wherein each of said two turbulators comprises a plurality of impellers mounted to said main body of said second rotary valve, wherein said plurality of impellers are arranged in a circle around each of said two second guides of said second rotary valve, wherein each of said two turbulators are opposite to each other, and wherein said two turbulators rotate said second rotary valve when said air flow from said lower flow passage pushes said plurality of impellers.

13. The apparatus of claim 11, wherein said first rotary valve further comprises two turbulators, wherein each of said two turbulators comprises a plurality of impellers radially mounted to each of said two first guides, wherein said two turbulators rotate said first rotary valve when said air flow from said middle flow passage pushes said plurality of impellers, wherein said second rotary valve further comprises two turbulators, wherein each of said two turbulators comprises a plurality of impellers radially mounted to each of said two second guides, and wherein said two turbulators rotate said second rotary valve when said air flow from said lower flow passage pushes said plurality of impellers.

14. The apparatus of claim 2, further comprises a first cage and a second cage, wherein a plurality of openings are formed on each of said first cage and said second cage, wherein said first cage further comprises at least one support rod having one end mounted to said first cage and another end mounted to said housing, wherein said second cage further comprises at least one support rod having one end mounted to said second cage and another end mounted to said housing, wherein said first cage is configured and positioned to allow said first rotary valve to move inside said first cage and above said first valve diaphragm without falling out of said first cage, and wherein said second cage is configured and positioned to allow said second rotary valve to move inside said second cage and above said second valve diaphragm without falling out of said second cage.

15. The apparatus of claim 1, further comprising an upper flow passage filter located in said upper flow passage and a lower flow passage filter located in said lower flow passage, and wherein said upper flow passage filter and lower flow passage filter have a predetermined sieve size to prevent a plurality of foreign objects from entering said housing.

16. The apparatus of claim 1, wherein said apparatus is configured to be inside said enclosed environment, wherein said enclosed environment has an ambient pressure in said enclosed environment, wherein said enclosed environment further comprises at least one conduit, wherein each said at least one conduit has a first end and a second end, wherein each of said at least one conduit has said first end connected to said lower flow passage of said apparatus and said second end extends out of said enclosed environment, wherein said upper flow passage pressure is adapted to said ambient pressure of said enclosed environment.

17. The apparatus of claim 1, wherein said apparatus is configured to be outside said enclosed environment, wherein said enclosed environment has an ambient pressure in said enclosed environment, wherein said enclosed environment further comprises at least one conduit, wherein each said at least one conduit has a first end and a second end, wherein said first end is connected to said upper flow passage of said apparatus and said second end is connected to and communicated with said enclosed environment, wherein said upper flow passage pressure is adapted to said ambient pressure of said enclosed environment.

18. The apparatus of claim 1, further comprising a pressure indicator, wherein said pressure indicator is responsive to said middle flow passage pressure, wherein said pressure indicator is visible on an external surface of said housing, and wherein said pressure indicator shows a pressure status of said middle flow passage pressure.

19. The apparatus of claim 18, further comprising a signal transmitter to transmit said pressure status of said pressure indicator.

20. An apparatus to allow or stop an air flow into an enclosed environment or piping system, comprising:
(a) an housing having an upper flow passage, a middle flow passage, a lower flow passage, wherein said upper flow passage has a sealed top end, wherein said upper flow passage is above said middle flow passage, wherein said middle flow passage is above said lower flow passage, wherein said lower flow passage is communicated with an ambient environment, wherein an upper flow passage pressure exists in said upper flow passage, wherein a middle flow passage pressure exists in said middle flow passage, and wherein a lower flow passage pressure exists in said lower flow passage;
(b) an inner pipe, wherein said inner pipe has a top end, a body, and a bottom end opposite to said top end, wherein said inner pipe is axially disposed inside said housing, wherein said top end communicates with said upper flow passage, wherein bottom end communicates with an enclosed environment or a piping system;
(c) a first valve seat, wherein said first valve seat is between said upper flow passage and said middle flow passage, wherein said first valve seat is ring-shape circumferentially disposed between said inner pipe and said housing, and wherein a first opening is formed through said first valve seat;
(d) a first valve diaphragm inside said housing, wherein said first valve diaphragm has an inner circumference and an outer circumference, wherein said first valve diaphragm is disposed between said housing and said inner pipe, wherein said first valve diaphragm is dimensioned and configured to cover said first opening formed through said first valve seat, wherein said first valve diaphragm has a predetermined weight, wherein said first valve diaphragm can move up and down inside said upper flow passage and above said first valve seat, wherein said first valve diaphragm is lifted away from said first valve seat when said middle flow passage pressure is greater than the upper flow passage pressure and said predetermined weight of said first valve diaphragm, wherein said first valve diaphragm is disposed on said first opening on said first valve seat when said middle flow passage pressure is less than or equal to the upper flow passage pressure and said predetermined weight of said first valve diaphragm, wherein said first valve diaphragm is in an open position when said first valve diaphragm is lifted away from said first valve seat allowing said air flow from middle flow passage into said upper flow passage, and wherein said first valve diaphragm is in a closed position when said first valve diaphragm is disposed on said first opening on said first valve seat preventing said air flow from middle flow passage flowing into said upper flow passage;
(e) a second valve seat, wherein said second valve seat is between said middle flow passage and said lower flow passage, wherein said second valve seat is ring-shape circumferentially disposed between said inner pipe and said housing, and wherein a second opening is formed through said second valve seat; and
(f) a second valve diaphragm inside said housing, wherein said second valve diaphragm has an inner circumference and an outer circumference, wherein said second valve diaphragm is disposed between said housing and said inner pipe, wherein said second valve diaphragm is dimensioned and configured to cover said second opening formed through said second valve seat, wherein said second valve diaphragm has a predetermined weight, wherein said second valve diaphragm can move up and down inside said middle flow passage and above said second valve seat, wherein said second valve diaphragm is lifted away from said second valve seat when said lower flow passage pressure is greater than said middle flow passage pressure and said predetermined weight of said second valve diaphragm, wherein said second valve diaphragm is disposed on said second opening on said second valve seat when said lower flow passage pressure is less than or equal to said middle flow passage pressure and said predetermined weight of said second valve diaphragm, wherein said second valve diaphragm is in an open position when said second valve diaphragm is lifted away from said second valve seat allowing said air flow from lower flow passage into said middle flow passage, and wherein said second valve diaphragm is in a closed position when said second valve diaphragm is disposed on said second opening on said second valve seat preventing said air flow from lower flow passage flowing into said middle flow passage.

21. The apparatus of claim 20, wherein said first valve diaphragm further comprises a plurality of protruding members extending radially from said inner circumference of said first valve diaphragm, and wherein said second valve diaphragm further comprises a plurality of protruding members extending radially from said inner circumference of said second valve diaphragm.

22. The apparatus of claim 20, wherein said first valve diaphragm further comprises a plurality of protruding members extending radially from said outer circumference of said first valve diaphragm, and wherein said second valve diaphragm further comprises a plurality of protruding members extending radially from said outer circumference of said second valve diaphragm.

23. The apparatus of claim 20, wherein said apparatus is configured to be outside said enclosed environment, wherein said enclosed environment has an ambient pressure in said enclosed environment, wherein said enclosed environment further comprises at least one conduit, wherein each said at least one conduit has a first end and a second end, wherein said first end is connected to said inner pipe of said apparatus and said second end is connected to and communicated with said enclosed environment, and wherein said upper flow passage pressure is adapted to said ambient pressure of said enclosed environment.

24. The apparatus of claim 20, further comprising a pressure indicator, wherein said pressure indicator is responsive to said middle flow passage pressure, wherein said pressure indicator is visible on an external surface of said housing, and wherein said pressure indicator shows a pressure status of said middle flow passage pressure.

25. The apparatus of claim 24, further comprising a signal transmitter to transmit said pressure status of said pressure indicator.

* * * * *